United States Patent
Nadig et al.

(10) Patent No.: US 11,990,116 B1
(45) Date of Patent: May 21, 2024

(54) DYNAMICALLY RENDERED NOTIFICATIONS AND ANNOUNCEMENTS

(71) Applicant: Amazon Technologies, Inc., Seattle, WA (US)

(72) Inventors: Vinaya Nadig, Bothell, WA (US); Mohit Nayak, Seattle, WA (US); Samarth Bhargava, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 353 days.

(21) Appl. No.: 17/027,907

(22) Filed: Sep. 22, 2020

(51) Int. Cl.
*G10L 13/02* (2013.01)
*G10L 15/18* (2013.01)
*G10L 15/22* (2006.01)

(52) U.S. Cl.
CPC .............. *G10L 13/02* (2013.01); *G10L 15/18* (2013.01); *G10L 15/22* (2013.01)

(58) Field of Classification Search
None
See application file for complete search history.

(56) References Cited

U.S. PATENT DOCUMENTS

| | | | | |
|---|---|---|---|---|
| 9,590,941 | B1 * | 3/2017 | Itoh | H04L 51/224 |
| 9,613,623 | B2 * | 4/2017 | Kang | G06F 3/167 |
| 10,276,185 | B1 * | 4/2019 | Ma | G10L 25/78 |
| 11,017,115 | B1 * | 5/2021 | Young | G10L 25/48 |
| 11,455,998 | B1 * | 9/2022 | Nadig | G10L 15/26 |
| 2007/0298770 | A1 * | 12/2007 | Lee | H04W 4/12 455/412.2 |
| 2009/0298474 | A1 * | 12/2009 | George | G10L 13/00 455/412.2 |
| 2013/0260721 | A1 * | 10/2013 | Carney | H04L 63/10 455/411 |
| 2015/0095014 | A1 * | 4/2015 | Marimuthu | G06F 40/284 704/9 |
| 2016/0077794 | A1 * | 3/2016 | Kim | G10L 15/20 704/275 |
| 2016/0261532 | A1 * | 9/2016 | Garbin | H04L 51/063 |
| 2016/0277349 | A1 * | 9/2016 | Bhatt | G06F 40/40 |
| 2017/0325171 | A1 * | 11/2017 | Xu | G06F 21/6209 |
| 2018/0107445 | A1 * | 4/2018 | Ohmura | G06F 3/16 |
| 2018/0114521 | A1 * | 4/2018 | Hwang | G10L 25/84 |

(Continued)

*Primary Examiner* — Jonathan C Kim
(74) *Attorney, Agent, or Firm* — Pierce Atwood LLP

(57) ABSTRACT

Techniques for rendering notification and announcement content for read time are described. A notification system provides non-natural language notification content. Sometime thereafter, a user input to output the notification content is received. In response, template-based or natural language generation processing is performed to convert the non-natural language notification content into natural language notification content including updated time information. The natural language notification content is then output to the user. Alternatively, a notification system provides non-natural language announcement content. Sometime thereafter, the template-based or natural language generation processing is performed to convert the non-natural language announcement content into natural language announcement content including updated time information. The natural language announcement content is then proactively output to an intended recipient user or group of users.

17 Claims, 11 Drawing Sheets

(56) References Cited

U.S. PATENT DOCUMENTS

| | | | | |
|---|---|---|---|---|
| 2018/0176885 A1* | 6/2018 | VanBlon | ................. | H04W 4/02 |
| 2018/0217968 A1* | 8/2018 | Bastide | ................. | G06F 40/169 |
| 2018/0227324 A1* | 8/2018 | Chambers | ........... | H04W 12/128 |
| 2019/0124032 A1* | 4/2019 | Ganesh | ................... | G06F 1/163 |
| 2019/0318758 A1* | 10/2019 | Ma | .......................... | G10L 21/04 |
| 2020/0118357 A1* | 4/2020 | Maltsev | ................. | G07C 5/008 |
| 2020/0126560 A1* | 4/2020 | Ho | .......................... | G06F 3/167 |
| 2020/0252478 A1* | 8/2020 | Dukellis | ................. | G06F 21/00 |
| 2020/0387995 A1* | 12/2020 | Bucciarelli | ............. | H04W 4/14 |
| 2021/0118063 A1* | 4/2021 | Zhao | .................... | H04N 21/266 |
| 2021/0209710 A1* | 7/2021 | Shetty | ................. | G06Q 10/107 |
| 2021/0233534 A1* | 7/2021 | Nadig | .................... | G06F 40/30 |
| 2021/0357182 A1* | 11/2021 | Peng | ...................... | G10L 13/02 |
| 2021/0377202 A1* | 12/2021 | Sullivan | ................ | H04L 51/224 |
| 2021/0406836 A1* | 12/2021 | Bar-On | ................ | G06F 40/205 |

\* cited by examiner

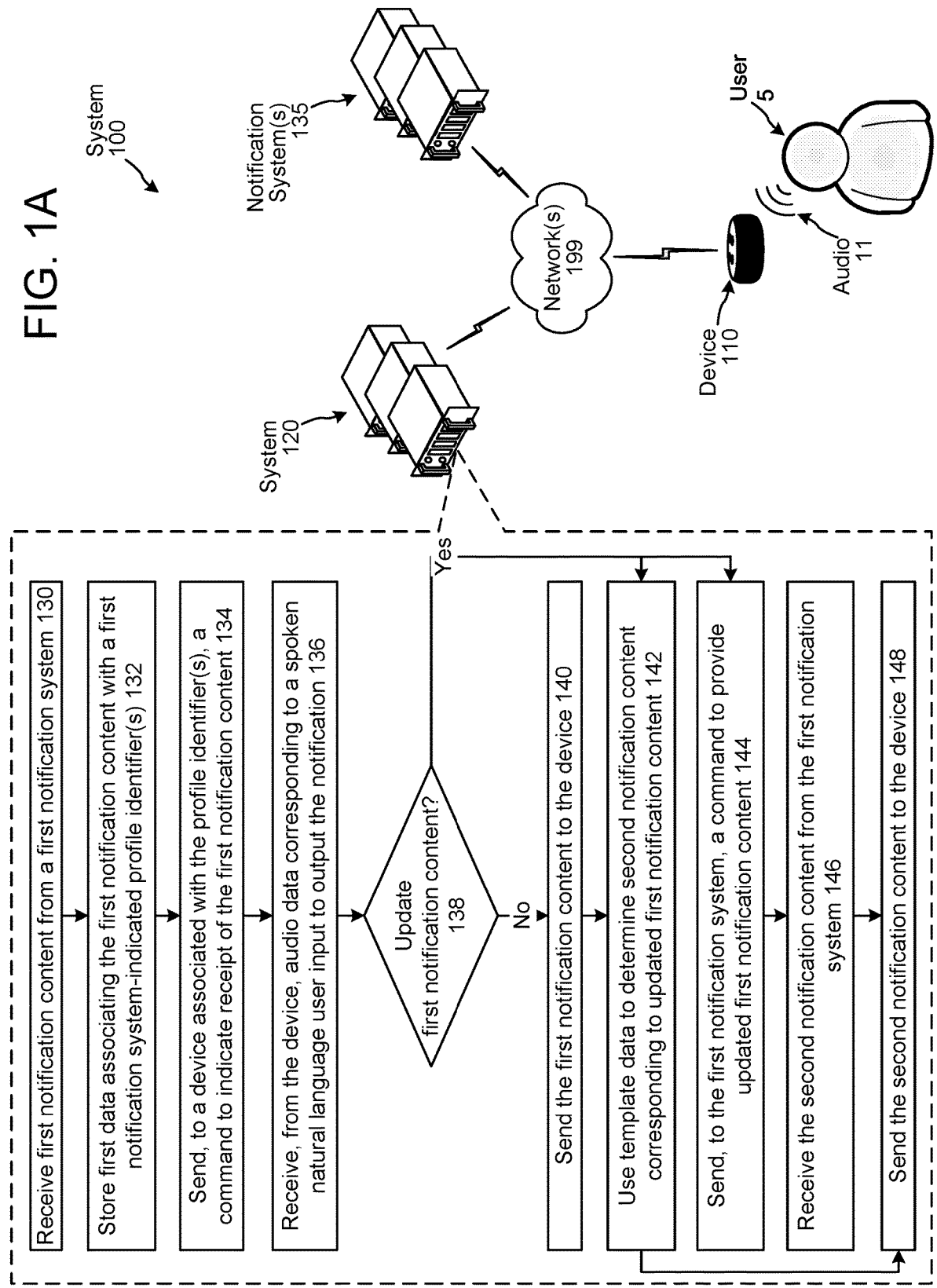

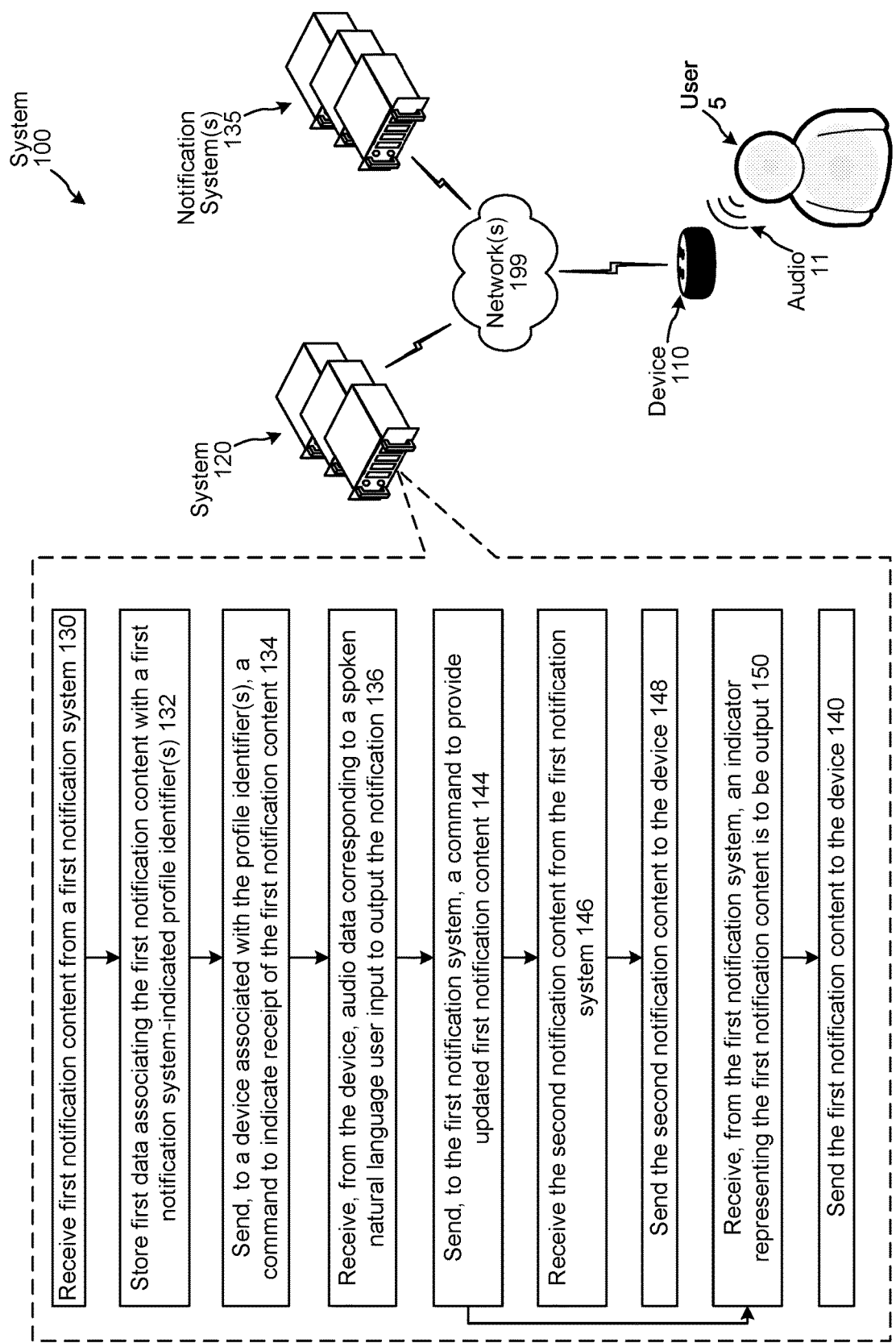

DYNAMICALLY RENDERED NOTIFICATIONS AND ANNOUNCEMENTS

BACKGROUND

Natural language processing systems have progressed to the point where humans can interact with computing devices using their voices and natural language textual inputs. Such systems employ techniques to identify the words spoken and typed by a human user based on the various qualities of received input data. Speech recognition combined with natural language understanding processing techniques enable speech-based user control of computing devices to perform tasks based on the user's spoken inputs. Speech recognition and natural language understanding processing techniques may be referred to collectively as spoken language understanding (SLU) processing. SLU processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1A is a conceptual diagram illustrating a system configured to dynamically render notification content to be tailored to when a user requests the notification content be output, according to embodiments of the present disclosure.

FIG. 1B is a conceptual diagram illustrating a system configured to dynamically render notification content to be tailored to when a user requests the notification content be output, according to embodiments of the present disclosure.

DETAILED DESCRIPTION

Figure 2:
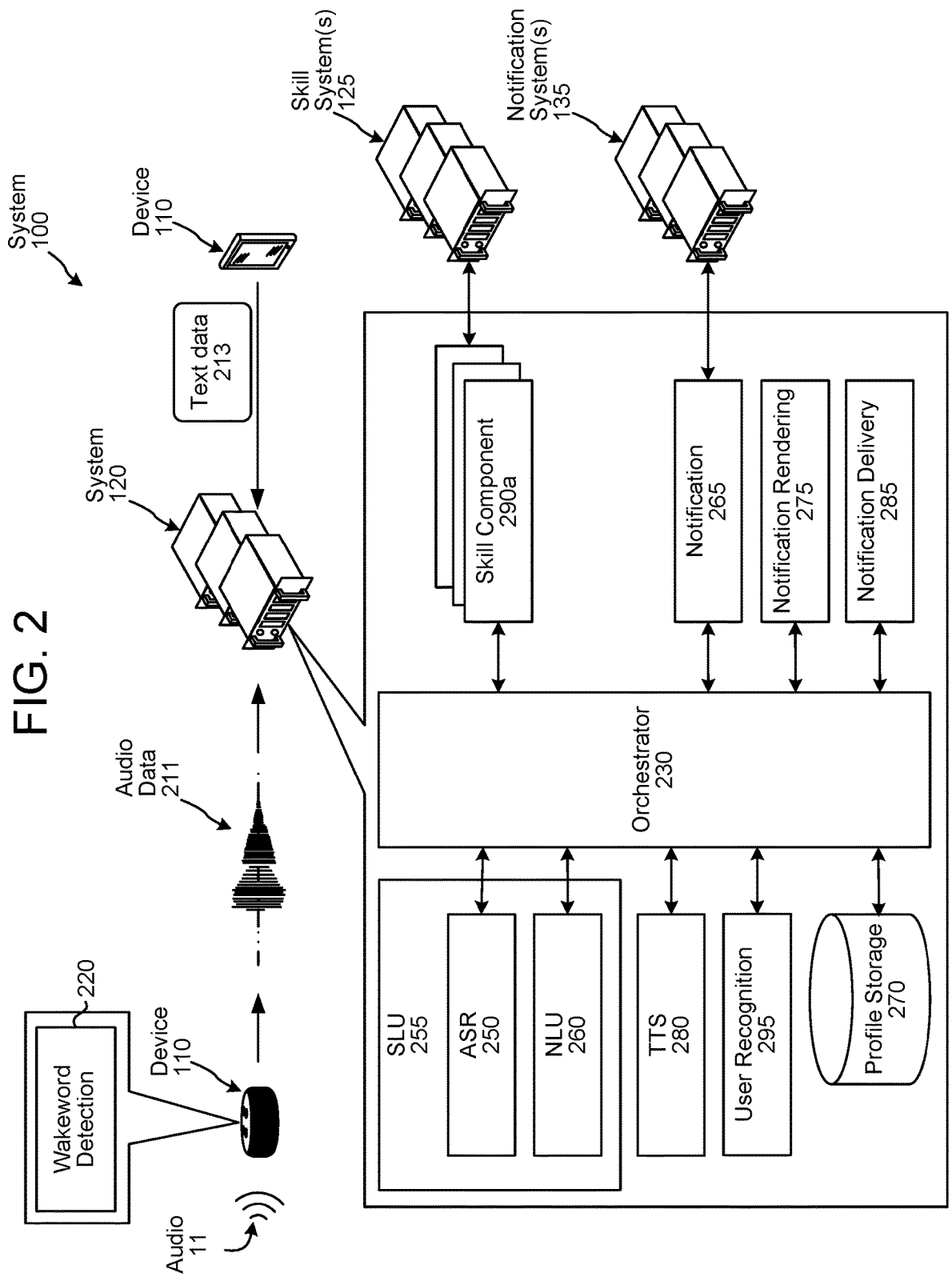
FIG. 2 is a conceptual diagram of components of a system, according to embodiments of the present disclosure.

Automatic speech recognition (ASR) is a field of computer science, artificial intelligence, and linguistics concerned with transforming audio data associated with speech into a token(s) or other textual representation of that speech. Natural language understanding (NLU) is a field of computer science, artificial intelligence, and linguistics concerned with enabling computers to derive meaning from natural language user inputs (such as spoken inputs). ASR and NLU are often used together as part of a spoken language understanding (SLU) processing component of a system. Text-to-speech (TTS) is a field of computer science, artificial intelligence, and linguistics concerned with transforming text and/or other data into audio data synthesized to resemble human speech.

A user may subscribe to receive notifications from one or more notification systems. As used herein, a "notification" may refer to data, output from a notification system when an event occurs, that is intended to cause a device to present some indicator to a user of the presence of notification content. A system, however, may not output notification content to the intended user until the user explicitly requests the notification content be output. For example, a system may receive notification content from a notification system and, in response thereto, the system may cause a device (of the user and/or group of users) to output an indication representing the user and/or group of users has at least one notification to be output. For example, the system may cause a device (e.g., a headless device) to activate a visual indicator (e.g., a light ring or other type of light) in a particular manner (e.g., flashing yellow) to indicate the user and/or group of users has the at least one notification to be output. For further example, the system may cause a device (e.g., a smart phone, tablet, smart television, or other device including or otherwise associated with a display) to display text, an image, a banner, or the like representing the user and/or group or users has the at least one notification to be output. For further example, the system may cause a device (e.g., a smart watch, a smart ring on a user's finger, smart glasses, a smart phone, table, or other mobile device) to vibrate in a particular manner (e.g., at a particular vibration strength, a particular vibration pattern, etc.) to indicate the user and/or group of users has the at least one notification to be output. Thereafter, in response to receiving a user input to output the at least one notification (e.g., in response to a user saying "Alexa, what are my notifications," "Alexa, output my notifications," or the like), the system may send audio data (corresponding to TTS-generated synthesized speech) and/or text data corresponding to the notification content to the device for output.

A user may additionally or alternatively subscribe to receive announcement from one or more notification systems. As used herein, an "announcement" may refer to when the system outputs content proactively (without first receiving a user input requesting the notification content), and that is proactively output to the intended user (or group of users) without requiring the user (or a user of the group of users) explicitly requesting the announcement content be output. For example, the system may receive announcement content from a notification system and, in response thereto, the system may cause a device (of the user and/or group of users) to output the announcement content without first indicating the announcement to the user(s) and without first receiving a user input requesting output of the announcement content. For example, upon receiving the announcement content, the system may send audio data (corresponding to TTS-generated synthesized speech) and/or text data corresponding to the announcement content to the device for output.

In at least some instances, notification/announcement content may be tailored to when the notification/announcement content is received by the system. For example, when notification/announcement content is received by the system, the notification/announcement content may correspond to "there are 3 [item name] available for purchase," "your [calendar meeting name] meeting is starting in 15 minutes," "[television show name] is starting in 10 minutes," "your taxi will be arriving in 3 minutes," or the like.

A user may not request the notification content be output until an amount of time (e.g., a minute, multiple minutes, an hour, multiple hours, a day, multiple days, etc.) has elapsed since the notification content indicator was output by the user's device. Moreover, the system may not output the announcement content until an amount of time has elapsed since the system received the announcement content. In at least some instances, the elapsing of time may render the notification/announcement content (e.g., the aforementioned number of items available for purchase, time until a start time of the calendar meeting, time until the start time of the television show, and time until the taxi arrives) no longer correct (in other words stale or out-of-date) or at least worth confirming at the point in time when the notification/announcement content is output.

The present disclosure provides, among other things, techniques for dynamically rendering notification/announcement content to be tailored to when the notification/announcement content is output. For example, in response to the system receiving a user input to output notification content, the system may determine (e.g., based on a type of the notification) whether the original notification content is to be updated for output to the user. In response to such a determination, or not in response to such a determination but to confirm the original notification content is still correct, the system may query a notification system (that provided the first notification content) for updated notification content and/or an affirmation that the original notification content is still correct. If the notification system determines the original notification content is still correct, the notification system may send an indication of such to the system, and the system may cause the original notification content to be output to the user. Conversely, if the notification system determines the original notification content is to be updated, the notification system may generate updated notification content (to include updated time information and/or additional information not available to the notification system at a time of sending the original notification content to the system), and may send the updated notification content to the system for output to the user. In at least some instances, the updated notification content may have a different grammar than the original notification content.

Teachings of the present disclosure provide an improved user experience by outputting temporally relevant notification/announcement content to the user.

A system according to the present disclosure may be configured to incorporate user permissions and may only perform activities disclosed herein if approved by a user. As such, the systems, devices, components, and techniques described herein would be typically configured to restrict processing where appropriate and only process user data in a manner that ensures compliance with all appropriate laws, regulations, standards, and the like. The systems, devices, components, and techniques can be implemented on a geographic basis to ensure compliance with laws in various jurisdictions and entities in which the components of the systems, devices, components, and/or user are located.

FIG. 1A illustrates a system 100 configured to dynamically render notification content to be tailored to when a user requests the notification content be output. Although the figures and discussion of the present disclosure illustrate certain steps in a particular order, the steps described may be performed in a different order (as well as certain steps removed or added) without departing from the present disclosure. As shown in FIG. 1A, the system 100 may include a device 110 (local to a user 5), a system 120, and at least one notification system 135 in communication across a network(s) 199. The network(s) 199 may include a local-area network(s) (LAN(s)), a wireless local-area network(s) (WLAN(s)), a Metropolitan Area Network(s), a Wide Area Network(s), a Campus Area Network(s), a mobile carrier system(s), and/or the like.

The system 120 receives (130) first notification content from a first notification system 135a. For example, the first notification content may correspond to a shopping notification and may include ordered product information and an anticipated delivery time. For further example, the first notification content may correspond to a calendar notification and may include a calendar event description and an amount of time until the calendar event starts. In another example, the first notification content may correspond to a television show event and may include a television show name and an amount of time until the television show starts. In a further example, the first notification content may correspond to a taxi arrival notification and may include a taxi service name, a license plate number, vehicle information, pickup location information, and an amount of time until the taxi is anticipated to arrive at the pickup location. In another example, the first notification content may correspond to a weather notification and may include weather information and an amount of time until the weather is expected to impact a geographic location in which the user is located. In at least some embodiments, the first notification content may include the various information in a structure, non-natural language format.

In at least some instances, the first notification system 135a may be an enterprise application implemented by a property manager (e.g., a rental property manager, a hotel manager, or the like). In such instances, the first notification system 135a may call an application program interface (API), of the notification component 265/365, directly.

The system 120 stores (132) first data associating the first notification content with a profile identifier(s) (e.g., a user profile identifier and/or group profile identifier) indicated by the first notification system. A group profile identifier may be associated with one or more individual user profile identifiers. For example, a group profile identifier may be associated with one or more user profile identifiers corresponding to one or more users of a single household. When the system 120 receives the first notification content from the first notification system 135a, the first notification content may be associated with a user profile identifier and/or group profile identifier corresponding to an intended user and/or group of users to receive the first notification content. The system 120 may store the first data to associate the first notification content with the first notification system-indicated user profile identifier and/or group profile identifier. In at least some embodiments, when the system 120 receives the first notification content as being associated with a group profile identifier, the system 120 may store the first data to associate the first notification content with each user profile identifier associated with the first notification system-indicated group profile identifier.

In response to receiving the first notification content, the system 120 sends (134), to a device 110 associated with the profile identifier(s), a command to indicate the system 120 received the first notification content. For example, the system 120 may determine the profile identifier(s) is associated with a device identifier corresponding to the device 110, and based thereon send the command to the device 110. In at least some embodiments, the system 120 may determine the profile identifier(s) is associated with a plurality of device identifiers, each corresponding to a different device 110. In such embodiments, the system 120 may send the command to a portion of or all of the plurality of devices 110.

The command may cause the device 110 to visually indicate the system 120 received the first notification content. In at least some embodiments, the device 110 may be a headless device (i.e., a device not including or otherwise being associated with a display). In such embodiments, the device 110 may indicate the system 120 received the first notification by activating a light (e.g., a light ring or other type of light) in a particular manner (e.g., flashing yellow). The command may additionally or alternatively cause the device 110 to indicate, in a haptic manner, that the system 120 received the first notification content.

While or after the device 110 indicates the system 120 has received the first notification content, the device 110 may receive audio corresponding to a spoken natural language user input from the user 5. The device 110 may determine audio data representing the audio, and may send the audio data to the system 120, which the system 120 receives (136). For example, the system 120 may perform ASR processing on the audio data to determine ASR output data, and may perform NLU processing on the ASR output data to determine NLU output data representing the spoken natural language user input requests the first notification content to be output. Alternatively, the system 120 may perform SLU processing on the audio data to determine NLU output data representing the spoken natural language user input requests the first notification content be output.

Thereafter, the system 120 determines (138) whether the first notification content is to be updated (e.g., due to the first notification content being no longer correct/stale). The system 120 may determine whether the first notification content is to be updated based at least in part on data provided by the notification system 135 at runtime when providing the first notification content to the system 120. The system 120 may additionally or alternatively determine whether the first notification content is to be updated based at least in part on data provided by the notification system 135 during offline operations. The system 120 may additionally or alternatively determine whether the first notification content is to be updated based at least in part on an output of a trained classifier at runtime. For example, the system 120 may implement a trained classifier to categorize the first notification content as corresponding to one of a plurality of notification types. The system 120 may determine whether the first notification content is to be updated based on the categorized notification type of the first notification content. Example notification types include alerts (e.g., configured to provide non-temporal information to a user) and events (e.g., configured to provide temporal information to a user). Examples of alert notifications include notifications to output news information, notifications to output advertisement information, and other like non-temporal information. Examples of event notifications include notifications regarding a number of products remaining to be sold, an upcoming start time of a meeting represented in a digital calendar, an upcoming start time of a television show, an upcoming anticipated taxi arrival time, and the like.

If the system 120 determines the first notification content does not need to be updated, the system 120 sends (140) the first notification content to the device 110 for output. The device 110 may present the first notification content using a display of or otherwise associated with the device 110 and/or may output synthesized speech (corresponding to the first notification content) using a speaker of or otherwise associated with the device 110.

If the system 120 determines the first notification content is to be updated, the system 120 may use (142) template data to determine second notification content corresponding to updated first notification content. For example, the template data may be used to render the structured, non-natural language first notification content into natural language second notification content. The template data may include a portion (e.g., a variable) to be populated with time information. For example, the first notification content may correspond to a shopping notification and include ordered product information and an anticipated delivery time (e.g., within the next hour), and the user input to output the first notification content may not be received until 15 minutes after the first notification content is provided to the system 120 by the first notification system 135*a*. In this example, the system 120 may determine 15 minutes has elapsed since the system 120 received the first notification content, determine an updated anticipated delivery time (e.g., within the next 45 minutes) based on the original anticipated delivery time and the elapsed duration of time, and (using the template data, the first notification content, and the updated anticipated delivery time) determine second notification content corresponding to the natural language "your order for [product name] is expected to be delivered within the next 45 minutes." For further example, the first notification content may correspond to a calendar notification and include a calendar event description and an amount of time until the calendar event starts (e.g., in 15 minutes), and the user input to output the first notification content may not be received until 3 minutes after the first notification content is provided to the system 120 by the first notification system 135*a*. In this example, the system 120 may determine 3 minutes has elapsed since the system 120 received the first notification content, determine an updated event start time (e.g., in 12 minutes) based on the original event start time and the elapsed duration of time, and (using the template data, the first notification content, and the updated start time) determine second notification content corresponding to the natural language "your [event title] is starting in 12 minutes." In another example, the first notification content may correspond to a taxi arrival notification and include a taxi service name, a license plate number, vehicle information, pickup location information, and an amount of time until the taxi is anticipated to arrive at the pickup location (e.g., 3 minutes), and the user input to output the first notification content may not be received until 3 minutes after the first notification content is provided to the system 120 by the first notification system 135*a*. In this example, the system 120 may determine 3 minutes has elapsed since the system 120 received the first notification content, determine an updated anticipated arrival time (e.g., now) based on the original anticipated arrival time and the elapsed duration of time, and (using the template data, the first notification content, and the updated anticipated arrival time) determine second notification content corresponding to the natural language "your ride from [taxi service name] is expected to arrive anytime, be on the lookout for a [vehicle information] having license plate number [license plate number] at [pickup location information]."

Alternatively, the system 120 may send (144), to the first notification system 135a, a command to provide updated first notification content. For example, the first notification content may correspond to a shopping notification and may represent 5 items are for sale. In response to receiving the command from the system 120, the first notification system 135a may determine only 2 items remain for sale, and based thereon determine second notification content corresponding to the natural language "only 2 [product name] are left." For further example, the first notification content may correspond to a calendar notification and include a calendar event description and an amount of time until the calendar event starts (e.g., in 15 minutes). In response to receiving the command, the first notification system 135a may determine the command was not received until 3 minutes after the first notification content was provided to the system 120 by the first notification system 135a. In this example, the first notification system 135a may determine 3 minutes has elapsed since the system 120 received the first notification content, determine an updated event start time (e.g., in 12 minutes) based on the original event start time and the elapsed duration of time, and determine second notification content corresponding to the natural language "your [event title] is starting in 12 minutes." In another example, the first notification content may correspond to a taxi arrival notification and include a taxi service name, a license plate number, vehicle information, pickup location information, and an amount of time until the taxi is anticipated to arrive at the pickup location (e.g., 3 minutes). In response to receiving the command, the first notification system 135a may determine the command was not received until 3 minutes after the first notification content was provided to the system 120. In this example, the first notification system 135a may determine 3 minutes has elapsed since the system 120 received the first notification content, determine an updated anticipated arrival time (e.g., now) based on the original anticipated arrival time and the elapsed duration of time, and determine second notification content corresponding to the natural language "your ride from [taxi service name] is expected to arrive anytime, be on the lookout for a [vehicle information] having license plate number [license plate number] at [pickup location information]." After the second notification content is generated by the first notification system 135a, the system 120 may receive (146) the second notification content from the first notification system 135a.

After determining or receiving the second notification content, the system 120 sends (148) the second notification content to the device 110 for output. For example, the system 120 may perform TTS processing on data representing the second notification content to generate audio data including synthesized speech corresponding to the second notification content, and may send the audio data to the device 110 to output the synthesized speech.

FIG. 1B illustrates another example of how the system 100 may be configured to dynamically render notification content to be tailored to when a user requests the notification content be output. According to FIG. 1B (as with FIG. 1A), the system 120 may receive (130) first notification content from a first notification system 135a; store (132) first data associating the first notification content with a profile identifier(s) (e.g., a user profile identifier and/or group profile identifier) indicated by the first notification system; send (134), to a device 110 associated with the profile identifier(s), a command to indicate the system 120 received the first notification content; and receive (136) audio data corresponding to a spoken natural language user input to output the first notification content.

In the example of FIG. 1B, the system 120 may not be configured to determine whether the first notification content is to be updated. Instead, after receiving the audio data, the system 120 may send (144), to the first notification system 135a, the command to provide updated first notification content. The first notification system 135a may perform processing, as described herein with respect to FIGS. 5-6, to determine whether the first notification content is to be updated. If the first notification system 135a determines the first notification content is to be updated, the first notification system 135a may generate second notification content, and may send the second notification content to the system 120, which the system 120 receives (146). Thereafter, the system 120 may send (148) the second notification content to the device 110 for output. For example, the system 120 may perform TTS processing on data representing the second notification content to generate audio data including synthesized speech corresponding to the second notification content, and may send the audio data to the device 110 to output the synthesized speech.

Alternatively, if the first notification system 135a determines the first notification content does not need to be updated, the first notification system 135a may output (and the system 120 may receive (150)) an indicator representing the first notification content is to be output. Thereafter, the system 120 may send (140) first notification content to the device 110 for output. For example, the system 120 may perform TTS processing on data representing the first notification content to generate audio data including synthesized speech corresponding to the first notification content, and may send the audio data to the device 110 to output the synthesized speech.

The system 100 may operate using various components as illustrated in FIG. 2. The various components may be located on a same or different physical devices. Communication between various components may occur directly or across a network(s) 199.

A microphone or array of microphones (of or otherwise associated with a device 110) may capture audio 11. The device 110 processes audio data, representing the audio 11, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data, the energy levels of the audio data in one or more spectral bands, the signal-to-noise ratios of the audio data in one or more spectral bands, or other quantitative aspects. In other examples, the device 110 may implement a classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110 may determine if the speech is directed at the device 110/system 120. In at least some embodiments, such determination may be made using a wakeword detection component 220. The wakeword detection component 220 may be configured to detect various wakewords. In at least some examples, each wakeword may correspond to a name of a different digital assistant. An example wakeword/digital assistant name is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data corresponding to a wakeword.

Thus, the wakeword detection component 220 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword detection component 220 detects a wakeword, the device 110 may "wake" and begin transmitting audio data 211, representing the audio 11, to the system 120. The audio data 211 may include data corresponding to the detected wakeword, or the device 110 may remove the portion of the audio corresponding to the detected wakeword prior to sending the audio data 211 to the system 120.

The system 120 may include an orchestrator component 230 configured to, among other things, coordinate data transmissions between components of the system 120. The orchestrator component 230 may receive the audio data 211 from the device 110, and send the audio data 211 to an ASR component 250.

The ASR component 250 transcribes the audio data 211 into ASR output data including one or more ASR hypotheses. An ASR hypothesis may be configured as a textual interpretation of the speech, or may be configured in another manner, such as one or more tokens. Each ASR hypothesis may represent a different likely interpretation of the speech in the audio data 211. Each ASR hypothesis may be associated with a score representing a confidence of ASR processing performed to determine the ASR hypothesis with which the score is associated.

The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211.

In at least some instances, instead of the device 110 receiving audio 11, the device 110 may receive a text-based (e.g., typed) natural language user input. The device 110 may determine text data 213 representing the typed natural language user input, and may send the text data 213 to the system 120, wherein the text data 213 is received by the orchestrator component 230.

The orchestrator component 230 may send the text data 213 or ASR output data output, depending on the type of natural language user input received, to a NLU component 260. The NLU component 260 processes the ASR output data or text data to determine one or more NLU hypotheses embodied in NLU output data. The NLU component 260 may perform intent classification (IC) processing on the ASR output data or text data to determine an intent of the natural language user input. An intent corresponds to an action to be performed that is responsive to the natural language user input. To perform IC processing, the NLU component 260 may communicate with a database of words linked to intents. For example, a music intent database may link words and phrases such as "quiet," "volume off," and "mute" to a <Mute> intent. The NLU component 260 identifies potential intents by comparing words and phrases in ASR output data or text data to the words and phrases in an intents database. In at least some embodiments, the NLU component 260 may communicate with multiple intents databases, with each intents database corresponding to one or more intents associated with a particular skill.

For example, IC processing of the natural language user input "play my workout playlist" may determine an intent of <PlayMusic>. For further example, IC processing of the natural language user input "call mom" may determine an intent of <Call>. In another example, IC processing of the natural language user input "call mom using video" may determine an intent of <VideoCall>. In yet another example, IC processing of the natural language user input "what is today's weather" may determine an intent of <OutputWeather>.

The NLU component 260 may also perform named entity recognition (NER) processing on the ASR output data or text data to determine one or more portions (which may be referred to as one or more slots) of the natural language user input that may be needed for post-NLU processing (e.g., processing performed by a skill). For example, NER processing of the natural language user input "play [song name]" may determine a slot corresponding to "SongName: [song name]." For further example, NER processing of the natural language user input "call mom" may determine a slot corresponding to "Recipient: Mom." In another example, NER processing of the natural language user input "what is today's weather" may determine a slot corresponding to "Date: Today."

In at least some embodiments, the intents identifiable by the NLU component 260 may be linked to one or more grammar frameworks with "slots" to be filled. Each slot of a grammar framework corresponds to a portion of ASR output data or text data that the NLU component 260 believes corresponds to an entity. For example, a grammar framework corresponding to a <PlayMusic> intent may correspond to sentence structures such as "Play {Artist Name}," "Play {Album Name}," "Play {Song name}," "Play {Song name} by {Artist Name}," etc.

For example, the NLU component 260 may perform NER processing to identify words in ASR output data or text data as subject, object, verb, preposition, etc. based on grammar rules and/or models. Then, the NLU component 260 may perform IC processing that involves using the identified verb to identify an intent. Thereafter, the NLU component 260 may again perform NER processing to determine a grammar model associated with the identified intent. For example, a grammar model for a <PlayMusic> intent may specify a list of slots applicable to play the identified "object" and any object modifier (e.g., a prepositional phrase), such as {Artist Name}, {Album Name}, {Song name}, etc. The NER processing may then involve searching corresponding fields in a lexicon, attempting to match words and phrases in the ASR output data that NER processing previously tagged as a grammatical object or object modifier with those identified in the lexicon.

NER processing may include semantic tagging, which is the labeling of a word or combination of words according to their type/semantic meaning. NER processing may include parsing ASR output data or text data using heuristic grammar rules, or a model may be constructed using techniques such as hidden Markov models, maximum entropy models, log linear models, conditional random fields (CRF), and the like. For example, NER processing with respect to a music skill may include parsing and tagging ASR output data or text data corresponding to "play mother's little helper by the rolling stones" as {Verb}: "Play," {Object}: "mother's little helper," {Object Preposition}: "by," and {Object Modifier}: "the rolling stones." The NER processing may identify "Play" as a verb based on a word database associated with the music skill, which IC processing determines corresponds to a <PlayMusic> intent.

The NLU component 260 may generate NLU output data including one or more NLU hypotheses, with each NLU hypothesis including the intent and slot(s) determined from IC processing and NER processing of the ASR output data or text data. In at least some embodiments, the NLU component 260 may perform IC processing and NLU processing with respect to different skills. One skill may support the same or different intents than another skill. Thus, the NLU output data may include multiple NLU hypotheses, with each NLU hypothesis corresponding to IC processing and NER processing performed on the ASR output or text data with respect to a different skill.

As described above, the system 120 may perform speech processing using two different components (e.g., the ASR component 250 and the NLU component 260). In at least some embodiments, the system 120 may implement a spoken language understanding (SLU) component 255 configured to process audio data 211 to determine NLU output data.

The SLU component 255 may be equivalent to a combination of the ASR component 250 and the NLU component 260. Yet, the SLU component 255 may process audio data 211 and directly determine the NLU output data, without an intermediate step of generating ASR output data. As such, the SLU component 255 may take audio data 211 representing speech and attempt to make a semantic interpretation of the speech. That is, the SLU component 255 may determine a meaning associated with the speech and then implement that meaning. For example, the SLU component 255 may interpret audio data 211 representing speech from the user 5 in order to derive a desired action. The SLU component 255 may output a most likely NLU hypothesis, or multiple NLU hypotheses associated with respective confidence or other scores (such as probability scores, etc.).

The NLU component 260 (or the SLU component 255 depending on configuration of the system 120) may send the NLU output data to the orchestrator component 230. The orchestrator component 230 may send the top-scoring NLU hypothesis (in the NLU output data) to a skill associated with the NLU hypothesis.

The system 120 may include one or more skill components 290 and/or may communicate with one or more skill systems 125 via one or more skill components 290. As used herein, a "skill" may refer to a skill component 290, a skill system 125, or a combination of a skill component 290 and a skill system 125. A skill may be configured to execute with respect to NLU output data. For example, for an NLU hypothesis including a <GetWeather> intent, the system 120 (and more particularly the orchestrator component 230) may invoke a weather skill to determine and output weather information for a geographic location represented in a user profile or corresponding to a location of the device 110 that captured the corresponding natural language user input. For further example, for an NLU hypothesis including a <BookRide> intent, the system 120 (and more particularly the orchestrator component 230) may invoke a taxi skill to book a requested ride. In another example, for an NLU hypothesis including a <BuyPizza> intent, the system 120 (and more particularly the orchestrator component 230) may invoke a restaurant skill to place an order for a pizza. A skill may operate in conjunction between the system 120 and other devices, such as the device 110, restaurant electronic ordering systems, taxi electronic booking systems, etc. in order to complete certain functions. Inputs to a skill may come from speech processing interactions or through other interactions or input sources.

A skill may be associated with a domain, a non-limiting list of which includes a smart home domain, a music domain, a video domain, a weather domain, a communications domain, a flash briefing domain, a shopping domain, and a custom domain.

The system 120 may include a TTS component 280 that determine audio data (e.g., synthesized speech) from text data using one or more different methods. Text data input to the TTS component 280 may come from a skill, the orchestrator component 230, or another component of the system 120.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to determine audio data including an artificial speech waveform. Parametric synthesis uses a computerized voice generator, sometimes called a vocoder.

The system 120 may include a user recognition component 295. The user recognition component 295 may recognize one or more users using various data. The user recognition component 295 may take as input the audio data 211. The user recognition component 295 may perform user recognition by comparing speech characteristics, in the audio data 211, to stored speech characteristics of users (e.g., stored speech characteristics associated with user profile identifiers associated with the device 110 that determined the audio data 211). The user recognition component 295 may additionally or alternatively perform user recognition by comparing biometric data (e.g., fingerprint data, iris data, retina data, etc.), received by the system 120 in correlation with a natural language user input, to stored biometric data of users (e.g., stored biometric data associated with user profile identifiers associated with the device 110 that determined the audio data 211 or otherwise captured a user input). The user recognition component 295 may additionally or alternatively perform user recognition by comparing image data (e.g., including a representation of at least a feature of a user), received by the system 120 in correlation with a natural language user input, with stored image data including representations of features of different users (e.g., stored image data associated with user profile identifiers associated with the device 110 that determined the audio data 211 or otherwise captured a user input). The user recognition component 295 may perform other or additional user recognition processes, including those known in the art. For a particular user input, the user recognition component 295 may perform processing with respect to stored data of users associated with the device 110 that captured the user input.

The user recognition component 295 determines whether a user input originated from a particular user. For example, the user recognition component 295 may determine a first value representing a likelihood that a user input originated from a first user, a second value representing a likelihood that user input originated from a second user, etc. The user recognition component 295 may also determine an overall confidence regarding the accuracy of user recognition processing.

The user recognition component 295 may output a single user profile identifier corresponding to the most likely user that originated the user input. Alternatively, the user recognition component 295 may output multiple user profile identifiers (e.g., in the form of an N-best list) with respective values representing likelihoods of respective users originating the user input. The output of the user recognition component 295 may be used to inform NLU processing, processing performed by a skill, as well as processing performed by other components of the system 120 and/or other systems.

The system 120 may include profile storage 270. The profile storage 270 may include a variety of data related to individual users, groups of users, devices, etc. that interact with the system 120. As used herein, a "profile" refers to a set of data associated with a user, group of users, device, etc. The data of a profile may include preferences specific to the user, group of users, device, etc.; input and output capabilities of one or more devices; internet connectivity data; user bibliographic data; subscription data; as well as other data.

The profile storage 270 may include one or more user profiles. Each user profile may be associated with a different user profile identifier. Each user profile may include various user identifying data. Each user profile may also include preferences of the user. Each user profile may include one or more device identifiers, representing one or more devices registered to the user. Each user profile may include identifiers of skills that the user has enabled. When a user enables a skill, the user is providing the system 120 with permission to allow the skill to execute with respect to the user's natural language user inputs. If a user does not enable a skill, the system 120 may not invoke the skill to execute with respect to the user's natural language user inputs.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may be associated with (or include) one or more device profiles corresponding to one or more devices associated with the group profile.

The profile storage 270 may include one or more device profiles. Each device profile may be associated with a different device identifier/device profile identifier. A device profile may include various device identifying data, input/output characteristics, networking characteristics, etc. A device profile may also include one or more user profile identifiers, corresponding to one or more user profiles associated with the device profile. For example, a household device's profile may include the user profile identifiers of users of the household.

The system 120 may include a notification component 265, a notification rendering component 275, and a notification delivery component 285 configured to process as described in detail with respect to FIGS. 4-7.

Figure 3:
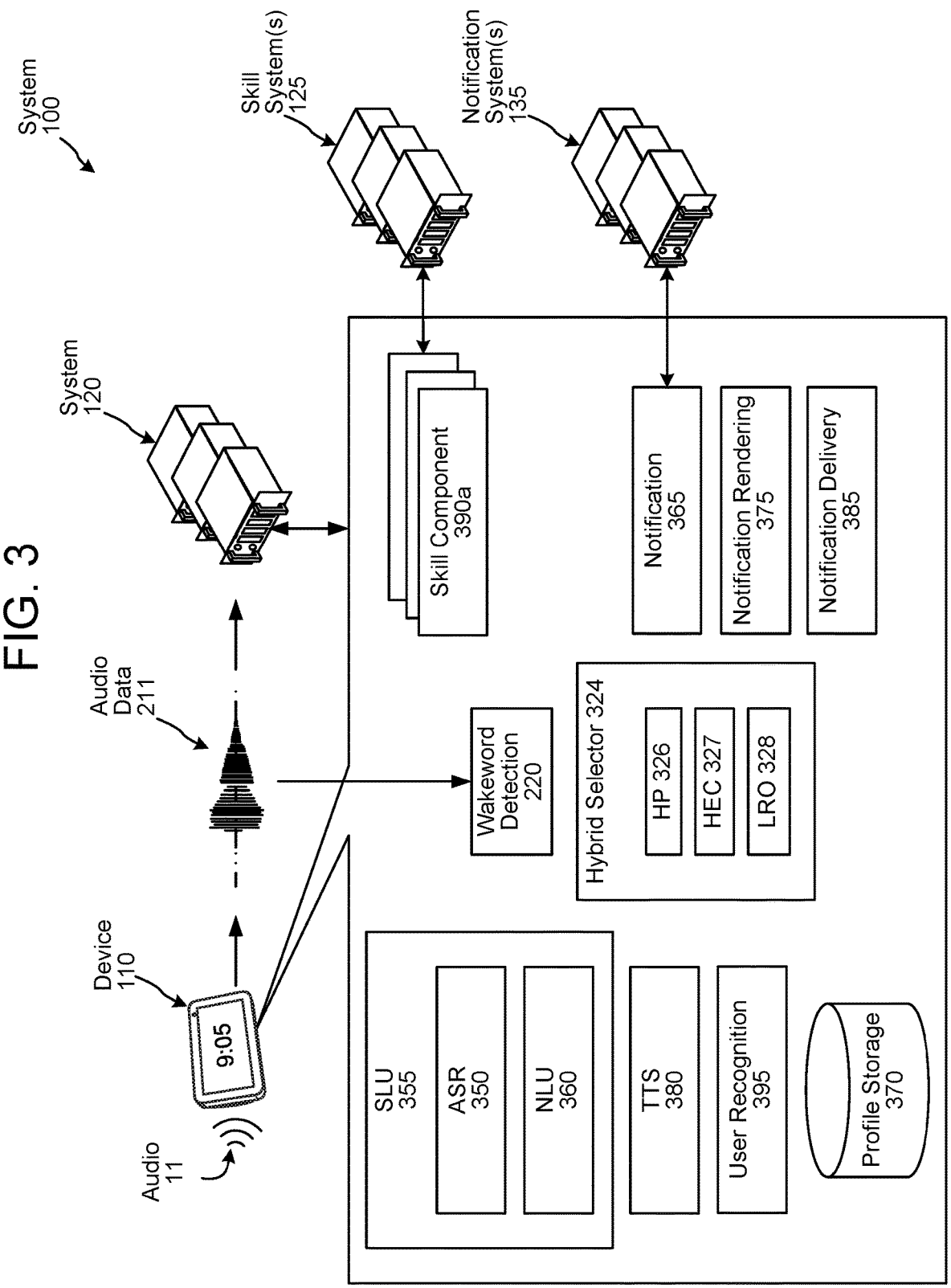
FIG. 3 is a conceptual diagram illustrating components that may be included in a device, according to embodiments of the present disclosure.

The foregoing describes illustrative components and processing of the system 120. In at least some embodiments, the device 110 may be configured to include some or all of the components, and perform some or all of the processing, of the system 120 described above. FIG. 3 illustrates such a configured device 110.

In at least some embodiments, the system 120 may receive the audio data 211 from the device 110, to recognize speech corresponding to a spoken input in the received audio data 211, and to perform functions in response to the recognized speech. In at least some embodiments, these functions involve sending directives (e.g., commands), from the system 120 to the device 110 (and/or other devices 110) to cause the device 110 to perform an action, such as output an audible response to the spoken input via a loudspeaker(s), and/or control secondary devices in the environment by sending a control command to the secondary devices.

Thus, when the device 110 is able to communicate with the system 120 over the network(s) 199, some or all of the functions capable of being performed by the system 120 may be performed by sending one or more directives over the network(s) 199 to the device 110, which, in turn, may process the directive(s) and perform one or more corresponding actions. For example, the system 120, using a remote directive that is included in response data (e.g., a remote response), may instruct the device 110 to output an audible response (e.g., using TTS processing performed by an on-device TTS component 380) to a user's question via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It is to be appreciated that the system 120 may be configured to provide other functions in addition to those discussed herein, such as, without limitation, providing step-by-step directions for navigating from an origin location to a destination location, conducting an electronic commerce transaction on behalf of the user 5 as part of a shopping function, establishing a communication session (e.g., a video call) between the user 5 and another user, and so on.

As noted with respect to FIG. 2, the device 110 may include a wakeword detection component 220 configured to compare the audio data 211 to stored models used to detect a wakeword (e.g., "Alexa") that indicates to the device 110 that the audio data 211 is to be processed for determining NLU output data (e.g., slot data that corresponds to a named entity, label data, and/or intent data, etc.). In at least some embodiments, a hybrid selector 324, of the device 110, may send the audio data 211 to the wakeword detection component 220. If the wakeword detection component 220 detects a wakeword in the audio data 211, the wakeword detection component 220 may send an indication of such detection to the hybrid selector 324. In response to receiving the indication, the hybrid selector 324 may send the audio data 211 to the system 120 and/or the ASR component 350. The wakeword detection component 220 may also send an indication, to the hybrid selector 324, representing a wakeword was not detected. In response to receiving such an indication, the hybrid selector 324 may refrain from sending the audio data 211 to the system 120, and may prevent the ASR component 350 from further processing the audio data 211. In this situation, the audio data 211 can be discarded.

The device 110 may conduct its own speech processing using on-device language processing components, such as an SLU component 355 (an ASR component 350 and an NLU 360), similar to the manner discussed above with respect to the SLU component 255 (or ASR component 250 and the NLU component 260) of the system 120. The device 110 may also internally include, or otherwise have access to, other components such as one or more skill components 390 capable of executing commands based on NLU output data or other results determined by the device 110/system 120, a user recognition component 395 (configured to process in a similar manner to that discussed above with respect to the user recognition component 295 of the system 120), profile storage 370 (configured to store similar profile data to that discussed above with respect to the profile storage 270 of the system 120), or other components. In at least some embodiments, the profile storage 370 may only store profile data for a user or group of users specifically associated with the device 110. Similar to as described above with respect to FIG. 2, a skill component 390 may communicate with a skill system(s) 125. The device 110 may include a notification component 365, a notification rendering component 375, and a notification delivery component 385 configured to process as described in detail with respect to FIGS. 4-7.

In at least some embodiments, the on-device language processing components may not have the same capabilities as the language processing components of the system 120. For example, the on-device language processing components may be configured to handle only a subset of the natural language user inputs that may be handled by the system 120. For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system 120. If the device 110 attempts to process a natural language user input for which the on-device language processing components are not necessarily best suited, the language processing results determined by the device 110 may indicate a low confidence or other metric indicating that the processing by the device 110 may not be as accurate as the processing done by the system 120.

The hybrid selector 324, of the device 110, may include a hybrid proxy (HP) 326 configured to proxy traffic to/from the system 120. For example, the HP 326 may be configured to send messages to/from a hybrid execution controller (HEC) 327 of the hybrid selector 324. For example, command/directive data received from the system 120 can be sent to the HEC 327 using the HP 326. The HP 326 may also be configured to allow the audio data 211 to pass to the system 120 while also receiving (e.g., intercepting) this audio data 211 and sending the audio data 211 to the HEC 327.

In at least some embodiments, the hybrid selector 324 may further include a local request orchestrator (LRO) 328 configured to notify the ASR component 350 about the availability of new audio data 211 that represents user speech, and to otherwise initiate the operations of on-device language processing when new audio data 211 becomes available. In general, the hybrid selector 324 may control execution of on-device language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the system 120 and chooses to use that remotely-determined directive data.

Thus, when the audio data 211 is received, the HP 326 may allow the audio data 211 to pass through to the system 120 and the HP 326 may also input the audio data 211 to the on-device ASR component 350 by routing the audio data 211 through the HEC 327 of the hybrid selector 324, whereby the LRO 328 notifies the ASR component 350 of the audio data 211. At this point, the hybrid selector 324 may wait for response data from either or both of the system 120 or the on-device language processing components. However, the disclosure is not limited thereto, and in some examples the hybrid selector 324 may send the audio data 211 only to the on-device ASR component 350 without departing from the disclosure. For example, the device 110 may process the audio data 211 on-device without sending the audio data 211 to the system 120.

The on-device ASR component 350 is configured to receive the audio data 211 from the hybrid selector 324, and to recognize speech in the audio data 211, and the on-device NLU component 360 is configured to determine a user intent from the recognized speech, and to determine how to act on the user intent by generating NLU output data which may include directive data (e.g., instructing a component to perform an action). Such NLU output data may take a form similar to that as determined by the NLU component 260 of the system 120. In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic API call with a same logical operation as a remotely-determined directive. In other words, a device-determined directive may mimic a remotely-determined directive by using a same, or a similar, format as the remotely-determined directive.

An NLU hypothesis (output by the NLU component 360) may be selected as usable to respond to a natural language user input, and local response data may be sent (e.g., local NLU output data, local knowledge base information, internet search results, and/or local directive data) to the hybrid selector 324, such as a "ReadyToExecute" response. The hybrid selector 324 may then determine whether to use directive data from the on-device components to respond to the natural language user input, to use directive data received from the system 120, assuming a remote response is even received (e.g., when the device 110 is able to access the system 120 over the network(s) 199), or to determine output audio requesting additional information from the user 5.

The device 110 and/or the system 120 may associate a unique identifier with each natural language user input. The device 110 may include the unique identifier when sending the audio data 211 to the system 120, and the response data from the system 120 may include the unique identifier to identify which natural language user input the response data corresponds.

In at least some embodiments, the device 110 may include, or be configured to use, one or more skill components 390 that may work similarly to the skill component(s) 290 implemented by the system 120. The skill component(s) 390 may correspond to one or more domains that are used in order to determine how to act on a spoken input in a particular way, such as by outputting a directive that corresponds to the determined intent, and which can be processed to implement the desired operation. The skill component(s) 390 installed on the device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the device 110 may be in communication with one or more skill systems 125. For example, a skill system 125 may be located in a remote environment (e.g., separate location) such that the device 110 may only communicate with the skill system 125 via the network(s) 199. However, the disclosure is not limited thereto. For example, in at least some embodiments, a skill system 125 may be configured in a local environment (e.g., home server and/or the like) such that the device 110 may communicate with the skill system 125 via a private network, such as a local area network (LAN).

As used herein, a "skill" may refer to a skill component 390, a skill system 125, or a combination of a skill component 390 and a skill system 125.

Figure 4:
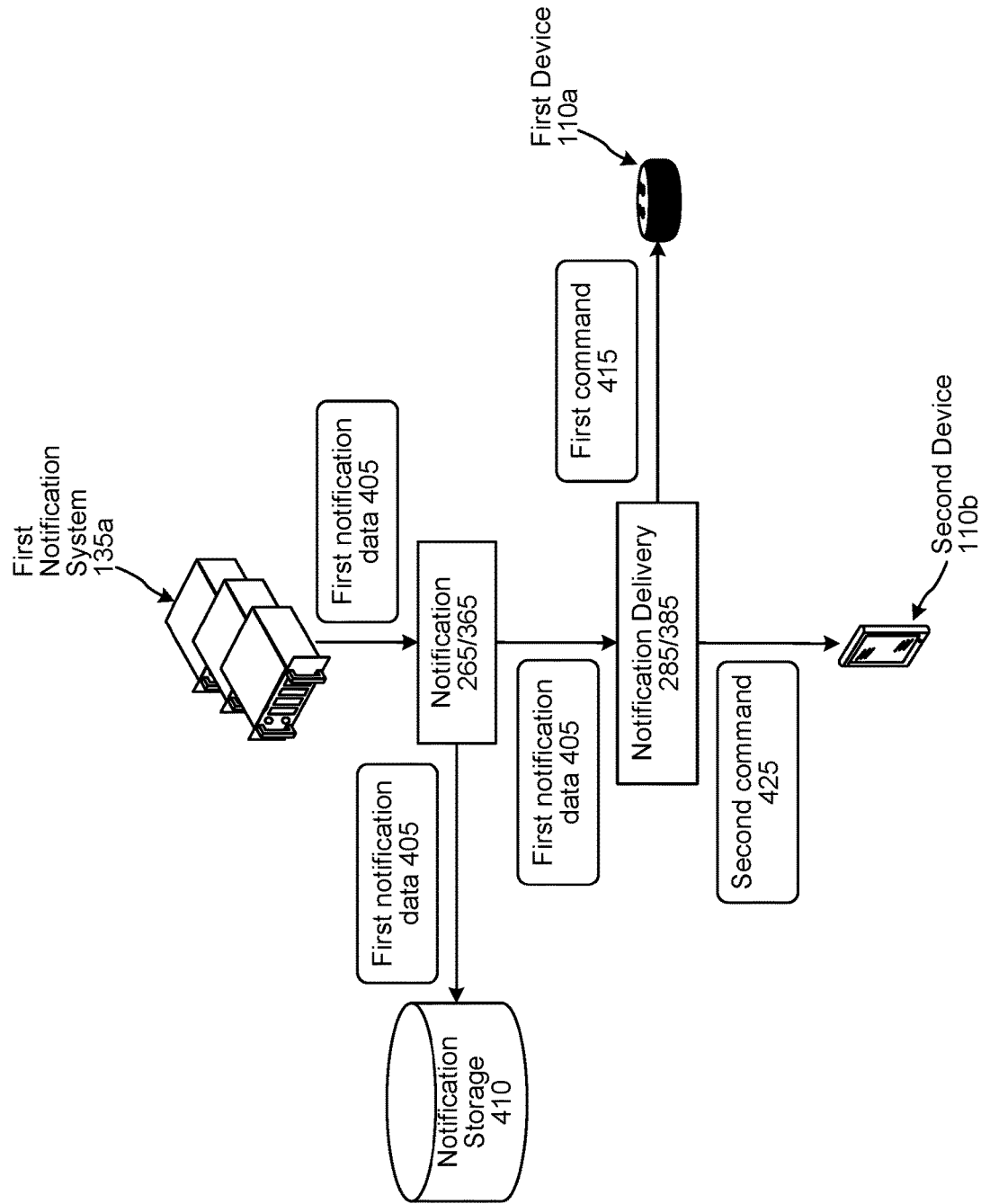
FIG. 4 is a conceptual diagram of components for indicating when a notification for a user and/or group of users has been received, according to embodiments of the present disclosure.

Referring now to FIG. 4, it is described how the system 120/a device(s) 110 may indicate to a user and/or group of users when a notification has been received for the user and/or group of users from a notification system 135. A first notification system 135a may send first notification data 406 to the notification component 265/365. In at least some embodiments, the first notification system 135a may be implemented as a skill system 125. In at least some embodiments, the first notification system 135a may be implemented as a skill component 290/390. In at least some embodiments, the first notification system 135a may be implemented as a software application.

The first notification data 405 may include information (e.g., one or more facts) corresponding to a particular topic (e.g., domain), such as electronic calendar, email, sports, weather, taxi, shopping, television, etc. The first notification data 405 may include the first notification content in a structured, tagged, non-natural language format. In other words, the first notification content may not be in a format that the first notification content would take when being output to an intended user and/or group of users. For example, the first notification data 405 may include first notification content corresponding to "EventTitle: Meeting with John; Time: 15 minutes," representing a meeting with John is starting in 15 minutes. For further example, the first notification data 405 may include first notification content corresponding to "SenderName: Jane; Time: 2 minutes," representing an email was received from Jane 2 minutes ago. In another example, the first notification data 405 may include first notification content corresponding to "SportsTeamName: Seahawks; Time: 30 minutes," representing a Seahawks game is starting in 30 minutes. For further example, the first notification data 405 may include first notification content corresponding to "WeatherType: Rain; Time: 45 minutes," representing it will start raining in about 45 minutes. In another example, the first notification data 405 may include first notification content corresponding to "TaxiServiceName: Bob's; ArrivalTime: 3 minutes; Vehicle: Red sedan; LicensePlate: ABCD1234; PickupLocation: 123 First Street," representing a red sedan, having license plate ABCD1234, from Bob's taxi service will be arriving in about 3 minutes at 123 First Street. For further example, the first notification data 405 may include first notification content corresponding to "ProductName: Dish soap; DeliveryTime: 45 minutes," representing ordered dish soap is expected to be delivered in about 45 minutes. In another example, the first notification data 405 may include first notification content corresponding to "TelevisionShow: News: Time: 10 minutes," representing the news will begin being televised in 10 minutes.

In addition to including information to be output to an intended user and/or group of users, the first notification data 405 may include a user profile identifier and/or group profile identifier corresponding to an intended user and/or group of users to receive the first notification content, respectively. In at least some embodiments, the first notification data 405 may include a user profile identifier and/or group profile identifier stored in the profile storage 270/370. In at least some other embodiments, the first notification data 405 may include an encoded user profile identifier corresponding to a user profile identifier stored in the profile storage 270/370. In at least some other embodiments, the first notification data 405 may include an encoded group profile identifier corresponding to a group profile identifier stored in the profile storage 270/370. In at least some embodiments, to maintain user privacy, the first notification system 135a may not have access to a user profile identifier and/or group profile identifier stored in the profile storage 270/370. In these embodiments, the first notification data 405 may include an identifier that uniquely corresponds to a particular user profile identifier and/or group profile identifier stored in the profile storage 270/370.

Upon receiving the first notification data 405 from the first notification system 135a, the notification component 265/

365 stores the first notification data 405 in a notification storage 410. The notification storage 410 may be implemented by the system 120 or a device 110. The notification storage 410 may store notification data corresponding to various notification content received from at least one notification system 135. For example, the first notification data 405 may be represented in the notification storage 410 as an entry including the first notification content associated with the user profile identifier and/or group profile identifier. In instances where the first notification data 405 includes an encoded user profile identifier or an encoded group profile identifier, the notification component 265/365 may perform one or more art-known/industry-known decoding techniques on the encoded user profile identifier or encoded group profile identifier to determine the corresponding user profile identifier and/or group profile identifier, and thereafter cause the decoded user profile identifier and/or group profile identifier to be associated with the first notification content in the notification storage 410. In instances where the first notification data 405 includes a unique identifier as described previously, the notification component 265/365 may use a table (including unique identifiers associated with respective user profile identifiers and/or group profile identifiers) to determine the unique identifier is associated with a particular user profile identifier and/or group profile identifier, and thereafter cause the particular user profile identifier and/or group profile identifier to be associated with the first notification content in the notification storage 410.

In at least some embodiments, the notification component 265/365 may confirm the intended user and/or group or users subscribed to receive the first notification content prior to storing the first notification data 405 in the notification storage 410. For example, the notification component 265/365 may determine the user profile identifier and/or group profile identifier represented in the first notification data 405, corresponding to an encoded user profile identifier or encoded group profile identifier represented in the first notification data 405, or corresponding to a unique identifier represented in the first notification data 405. The notification component 265/365 may determine (in the profile storage 270/370) user profile data and/or group profile data corresponding to the user profile identifier and/or group profile identifier, respectively. The notification component 265/365 may determine whether the user profile data and/or group profile data represents the user and/or group of users has authorized the first notification system 135a to provide notification content. If the notification component 265/365 determines the user profile data and/or group profile data does not represent the user and/or group of users has provided the foregoing authorization, the notification component 265/365 may prevent the first notification data 405 from being stored in the notification storage 410, and may delete the first notification data 405. Conversely, if the notification component 265/365 determines the user profile data and/or group profile data represents the user and/or group of users has provided the foregoing authorization, the notification component 265/365 may store the first notification data 405 in the notification storage 410.

In at least some embodiments, the notification component 265/365 may determine whether the user profile data and/or group profile data represents the user and/or group of users has authorized the first notification system 135a to provide notification content corresponding to a specific notification type represented in the first notification data 405. Example notification types include, but are not limited to, new email notifications, upcoming television show notifications, taxi upcoming arrival notifications, product upcoming delivery notifications, and upcoming calendar event notifications. If the notification component 265/365 determines the user profile data and/or group profile data does not represent the user and/or group of users has provided the foregoing authorization, the notification component 265/365 may prevent the first notification data 405 from being stored in the notification storage 410, and may delete the first notification data 405. Conversely, if the notification component 265/365 determines the user profile data and/or group profile data represents the user and/or group of users has provided the foregoing authorization, the notification component 265/365 may store the first notification data 405 in the notification storage 410.

After receiving the first notification data 405 from the first notification system 135a (and optionally after storing the first notification data 405 in the notification storage 410), the notification component 265/365 sends the first notification data 405 to the notification delivery component 285/385. Generally, the notification delivery component 285/385 is configured to selectively indicate to the user and/or group of users that the user and/or group of users has received a notification.

In at least some embodiments, a device 110 may output an indication (e.g., a flashing yellow light, vibration of the device 110, etc.) that a user and/or group of users has received a notification from a time when the notification component 265/365 receives and stores notification data and until corresponding notification content is output to the user and/or group of users. Accordingly, there may be instances when a device(s) 110 of the user and/or group of users is outputting an indication of a previously received notification when the notification component 265/365 receives and stores the first notification data 405. Thus, after receiving the first notification data 405, the notification delivery component 285/385 may determine whether a device(s) 110 of the user and/or group of users is presently outputting an indication representing the user and/or group of users has received a notification(s).

As part of the foregoing determination, the notification delivery component 285/385 may determine a user profile identifier and/or group profile identifier represented in the first notification data 405. If the first notification data 405 includes an encoded user profile identifier or encoded group profile identifier corresponding to a user profile identifier stored in the profile storage 270/370, the notification delivery component 285/385 may perform one or more art-known/industry-known decoding techniques on the encoded user profile identifier or encoded group profile identifier to determine the corresponding user profile identifier and/or group profile identifier. If the first notification data 405 includes a unique identifier as described previously, the notification delivery component 285/385 may use a table (including unique identifiers associated with respective user profile identifiers and/or group profile identifiers) to determine the unique identifier is associated with a particular user profile identifier and/or group profile identifier. Alternatively, if the first notification data 405 includes an encoded user profile identifier, group profile identifier, or unique identifier, the notification component 265/365 may determine the corresponding user profile identifier and/or group profile identifier, and send same to the notification delivery component 285/385.

After receiving or determining the user profile identifier and/or group profile identifier, the notification delivery component 285/385 may determine one or more device identifiers (e.g., device serial numbers) associated with the user profile identifier and/or group profile identifier. In other words, the notification delivery component 285/385 determines one or more device identifiers corresponding to one or more devices 110 registered to a user and/or group of users corresponding to the user profile identifier and/or group profile identifier.

Thereafter, the notification delivery component 285/385 may determine whether at least one of the one or more device identifiers is associated with data (e.g., a flag or other indicator) representing a device(s) 110 is presently outputting an indication that the user and/or group of users has a notification(s). If the notification delivery component 285/385 determines a device(s) 110 is present outputting an indication, the notification delivery component 285/385 may cease processing with respect to the first notification data 405. Conversely, if the notification delivery component 285/385 determines no devices 110 of the user and/or group of users are presently outputting an indication, the notification delivery component 285/385 may determine how the first notification content is to be indicated to the user and/or group of users.

The notification delivery component 285/385 may determine how to indicate the first notification content based on device characteristics. The notification delivery component 285/385 may be configured to cause a device 110 to indicate notifications by activating a light(s) of the device 110 in a particular manner, by causing the device 110 to vibrate in a particular manner, and/or by displaying content on a display of or otherwise associated with the device 110. The notification delivery component 285/385 may determine one or more device identifiers associated with the user profile identifier and/or group profile identifier received or determined by the notification delivery component 285/385. Thereafter, the notification delivery component 285/385 may query the profile storage 270/370 for device characteristic data represented in device profile data associated with a device identifier in the profile storage 270/370. The device characteristic data may represent, for example whether the device 110 (corresponding to the device characteristic data) has a light(s) capable of indicating a user and/or group of users has a notification(s) and/or whether the device 110 includes or is otherwise in communication with a display capable of displaying content indicating a user and/or group of users has a notification(s).

The notification delivery component 285/385 may indicate the first notification content to the user and/or group of users based on the device characteristic data. For example, if the notification delivery component 285/385 receives first device characteristic data representing a first device 110*a* includes a light(s), the notification delivery component 285/385 may send, to the first device 110*a*, a first command 415 to activate the light(s) in a manner that indicates the user and/or group of users has received a notification(s). In some situations, two or more devices of the user and/or group of users may be capable of indicating the first notification content using lights of the two or more devices. In such situations, the notification delivery component 285/385 may send, to each of the two or more devices, a command to cause the respective device's light(s) to indicate the user and/or group of users has received a notification(s).

The notification delivery component 285/385 may additionally or alternatively receive second device characteristic data representing a second device 110*b* includes or is otherwise in communication with a display. In response to receiving the second device characteristic data, the notification delivery component 285/385 may send, to the second device 110*b*, a second command 425 to display text, an image, a popup graphical element (e.g., a banner) that indicates the user and/or group of users has received a notification(s). For example, the displayed text may correspond to "you have an unread notification." But the text may not include specifics of the first notification content. An example of the second command 425 may be a mobile push command.

In some situations, two or more devices of the user and/or group of users may be capable of indicating the first notification content by displaying content. In such situations, the notification delivery component 285/385 may send, to each of the two or more devices, a command to cause the respective device to display content indicating the user and/or group of users has received a notification(s).

The notification delivery component 285/385 may additionally or alternatively receive device characteristic data representing a device 110 includes a haptic component. In response to receiving the device characteristic data, the notification delivery component 285/385 may send, to the device 110, a command to vibrate in a manner (e.g., at a particular rate, at a particular strength, etc.) that indicates the user and/or group of users has received a notification(s).

The notification delivery component 285/385 may determine how to indicate the first notification content based on user profile data and/or group profile data corresponding to the user profile identifier and/or group profile identifier received or determined by the notification delivery component 285/385. For example, the notification delivery component 285/385 may query the profile storage 270/370 for one or more indication preferences associated with the user profile identifier and/or group profile identifier in the profile storage 270/370. An indication preference may indicate whether notifications, received from a notification system 135, are to be indicated using a light of a device 110 and/or displayed content. An indication preference may alternatively indicate whether notifications, corresponding to a particular topic/domain, are to be indicated using a light of a device 110 and/or displayed content. An indication preference may alternatively indicate whether notifications, received from a notification system 135 and corresponding to a topic/domain, are to be indicated using a light of a device 110 and/or displayed content.

The notification delivery component 285/385 may additionally or alternatively determine how to indicate the first notification content based on a preference of the first notification system 135*a* that provided the first notification data. For example, during offline operations, the first notification system 135*a* may indicate notifications provided by the first notification system 135*a* are to be indicated using a light of a device 110 and/or displayed content. For further example, during offline operations, the first notification system 135*a* may indicate notifications, corresponding to a particular type/domain and being provided by the first notification system 135*a*, are to be indicated using a light of a device 110 and/or displayed content. In another example, the first notification system 135*a* may indicate, at runtime, how the first notification content is to be indicated. For example, the first notification data 405 may include a portion representing the first notification system 135*a* recommends the first notification content be indicated to the user and/or group of users. For example, the first notification data 405 may include a portion representing the first notification content is to be indicated using a light of a device 110 and/or displayed content.

In some situations, the notification delivery component 285/385 may determine a user preference(s) and a notification system preference(s) for indicating the first notification content to the user and/or group of users. The notification delivery component 285/385 may give priority to the user preference(s) in situations where the user preference(s) does not conform with the notification system preference(s) (e.g., the user preference(s) indicates the first notification content is to be indicated using a light(s), but the notification system preference(s) indicates the first notification content is to be indicated using displayed content, or vice versa).

In some situations, the notification delivery component 285/385 may determine no device 110 of the user and/or group of users is capable of indicate the first notification content as preferred by either a user preference(s) or a notification system preference(s). In such situations, the notification delivery component 285/385 may cause the device(s) 110 of the user and/or group of users to indicate the first notification according to characteristics of the device(s) 110.

If the notification delivery component 385 is implemented on device, the notification delivery component 385 may send a command to a component implemented by the same device 110. The notification delivery component 385 may also send a command to a different device 110 (associated with the same user profile identifier and/or group profile identifier as the device 110 implementing the notification delivery component 385) using one or more wireless data transmissions (e.g., via a network(s) 199, using Bluetooth, etc.).

Figure 5:
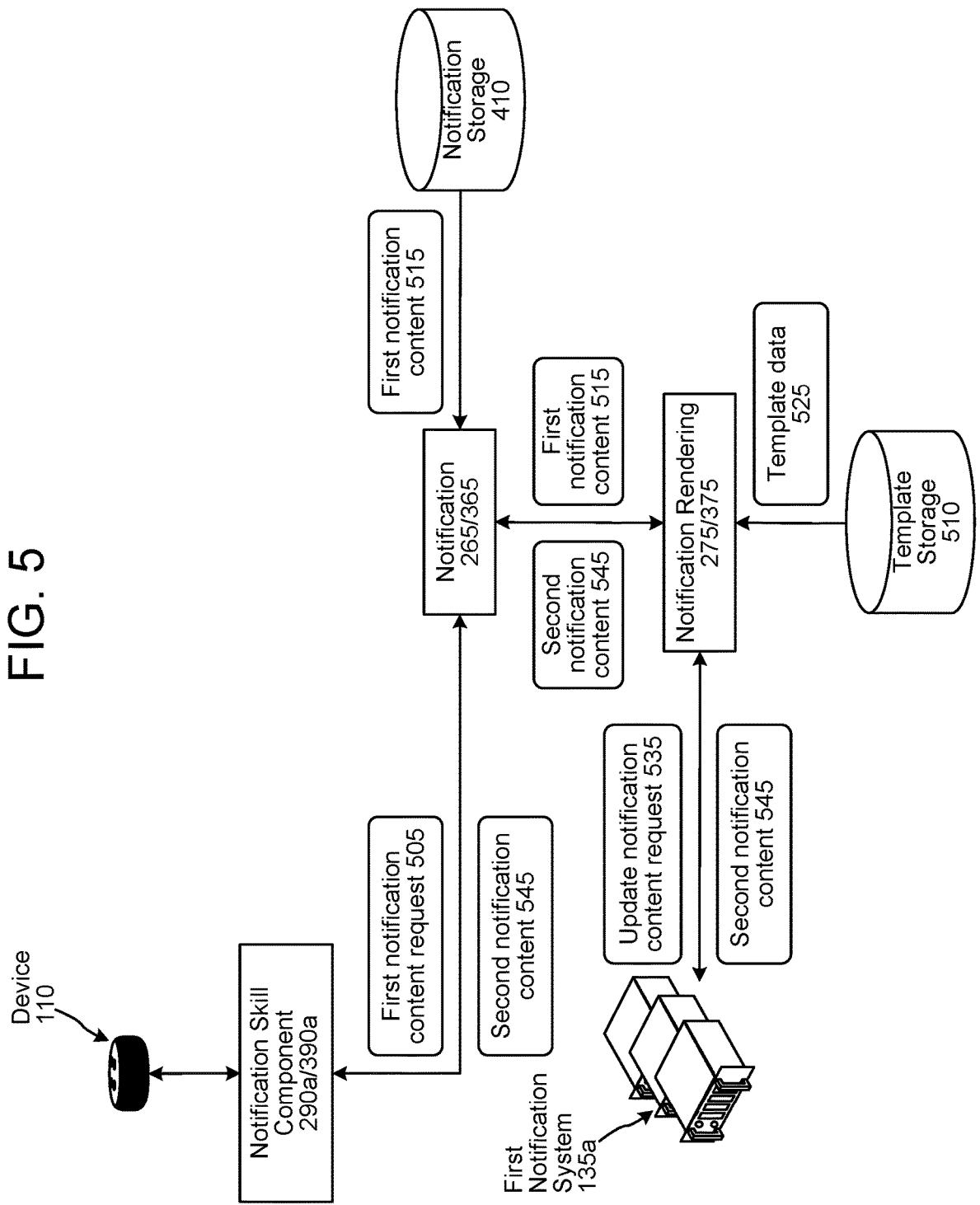
FIG. 5 is a conceptual diagram of components for generating updated notification content at a time of output of a notification, according to embodiments of the present disclosure.

With reference to FIG. 5, sometime after the notification delivery component 285/385 causes at least one device 110 of the user and/or group of users to indicate the user and/or group of users have a notification(s), a device 110 of the user and/or group of users may receive a user input to output the first notification content. For example, the device 110 may receive audio corresponding to a spoken natural language user input to output the first notification content. For further example, the device 110 may receive a text-based (e.g., typed) natural language user input to output the first notification content. In another example, the device 110 may include or otherwise be associated with a camera that captures a sequence of images representing the user 5 performing a gesture (an example of a user input) to output the first notification content. In a further example, the device 110 may include a button or display a virtual button (or other graphical user interface (GUI) element capable of being interacted with by the user 5), and the device 110 may detect the user 5 interacting with the button or other GUI element (an example of a user input) to output the first notification content.

In at least some embodiments, the device 110 may send data, representing the user input, to the system 120 for processing. In some instances, the device 110 may be configured to communicate with (i.e., send data to and received data from) the system 120 via an application installed on the device 110 and associated with the system 120. Such an application may be referred to as a companion application. An example of such an application is the Amazon Alexa application that may be installed on a smart phone or tablet.

The device 110 or system 120 (depending on the components illustrated in FIGS. 2-3 being implemented) processes data representing the user input (e.g., audio data representing a spoken natural language user input, text data representing a text-based natural language user input, data representing a performed gesture, data representing a button interaction, etc.) to determine skill input data representing the user input represents the first notification content is to be output, and including a user profile identifier and/or group profile identifier associated with the device 110 (that captured the user input) and/or user 5 (that provided the user input). In response, the device 110 or system 120 may send the skill input data to a notification skill component 290a/390a.

The notification skill component 290a/390a processes the skill input data to determine the skill input data represents the first notification content is to be output, and includes the user profile identifier and/or group profile identifier. In response to such processing, the notification skill component 290a/390a determines a first notification content request 505 representing the first notification content is to be output, and including the user profile identifier and/or group profile identifier. The notification skill component 290a/390a sends the first notification content request 505 to the notification component 265/365.

In response to receiving the first notification content request 505, the notification component 265/365 queries the notification storage for the first notification content 515 based on the first notification content 515 being associated with the user profile identifier and/or group profile identifier (represented in the first notification content request 505) in the notification storage 410. After receiving the first notification content 515, the notification component 265/365 sends the first notification content 515 to the notification rendering component 275/375.

In response to receiving the first notification content 515, the notification rendering component 275/375 determines whether the first notification content 515 should be updated (e.g., due to the first notification content 515 being incorrect/stale based on when the user 5 requested output of the first notification content 515), or should be output without updated content. The notification rendering component 275/375 may make this determination based on one or more considerations.

The notification rendering component 275/375 may determine whether the first notification content 515 is to be updated based at least in part on data provided by the first notification system 135a at runtime when providing the first notification data 405 to the notification component 265/365. For example, the first notification data 405 may include a portion representing whether the first notification content 515 is to be updated when rendering the first notification content for output to the intended user and/or group of users. When the first notification data 405 includes such a data portion, the notification component 265/365 may send the data portion to the notification rendering component 275/375 in conjunction with sending the first notification content 515 to the notification rendering component 275/375. Alternatively, the notification rendering component 275/375 may query the notification storage 410 regarding whether the first notification content 515 is associated (in the notification storage 410) with data representing the first notification content 515 is to be updated at time of rendering.

The notification rendering component 275/375 may determine whether the first notification content 515 is to be updated based at least in part on data provided by a notification system 135 during offline operations. For example, when a notification system 135 registers with the system 100 to provide notifications to users of the system 100, the notification system 135 may indicate one or more notification types (that will be provided to the notification component 265/365 by the notification system 135 after the notification system 135 becomes registered) that are to be updated when being output to the intended user and/or group of users. The system 120/device 110 may store data indicating, for a given notification system, one or more notification types that are to undergo updating. At runtime, after receiving the first notification content 515 from the notification component 265/365, the notification rendering component 275/375 may determine a first notification system identifier (of the first notification system 135a that provided the first notification content 515 to the notification component 265/365), determine one or more notification types associated with the first notification system identifier in storage, and determine whether a type of the first notification content 515 is represented in the one or more notification types. Illustrative notification types include weather information notifications, television show reminder notifications, taxi anticipated arrival notifications, electronic calendar event notifications, and product delivery notifications.

The notification rendering component 275/375 may determine whether the first notification content 515 is to be updated based at least in part on an output of a trained classifier at runtime. For example, the notification rendering component 275/375 may implement a trained classifier to categorize notification content as corresponding to one of a plurality of notification types. The notification rendering component 275/375 may implement the trained classifier with respect to the first notification content 515 to determine the first notification content 515 corresponds to a particular notification type, and may determine whether the first notification content 515 is to be updated based on the categorized notification type of the first notification content 515.

If the notification rendering component 275/375 determines the first notification content 515 does not need to be updated, the notification rendering component 275/375 may cause the first notification content 515 to be output by the device 110 that received the user input indicating the first notification content was to be output. For example, the notification rendering component 275/375 may use one or more art-known/industry-known natural language generation techniques to generate natural language text data representing the first notification content 515. For further example, the notification rendering component 275/375 may use a template to render the first notification content 515 into natural language text data. The natural language text data may be sent to the device 110 for display. Additionally or alternatively, the natural language text data may be sent to the TTS component 280/380, the TTS component 280/380 may perform TTS processing on the natural language text data to generate audio data including synthesized speech corresponding to the natural language text data, and the audio data may be sent to the device 110 to output the synthesized speech.

Conversely, if the notification rendering component 275/375 determines the first notification content 515 is to be updated, the notification rendering component 275/375 may determine which, of a plurality of techniques, is to be used to update the first notification content 515.

The notification rendering component 275/375 may use a template-based approach to generate second notification content 545 corresponding to an updated natural language version of the first notification content 515. A template may include natural language with portions (e.g., variables) to be populated with information from the first notification content 515. A template may be associated with a notification system 135. A template may additionally or alternatively be associated with a notification type. For example, a calendar event notification template may include the natural language "your calendar entry titled [event title] is starting in [time information]," with [event title] and [time information] corresponding to portions to be populated. For further example, an email notification template may include the natural language "you received an email from [sender name] [time information] ago," with [sender name] and [time information] corresponding to portions to be populated. In another example, a sporting event notification template may include the natural language "the [team name] game is starting in [time information]," with [team name] and [time information] corresponding to portions to be populated. For further example, a weather notification template may include the natural language "it will be [weather type] at your location in about [time information]," with [weather type] and [time information] corresponding to portions to be populated. In another example, a taxi arrival notification template may include the natural language "your ride from [taxi service name] is expected to arrive in [time information], be on the lookout for a [vehicle information] having license plate number [license plate number] at [pickup location]," with [taxi service name], [time information], [vehicle information], [license plate number], and [pickup location] corresponding to portions to be populated. For further example, a product delivery notification template may include the natural language "your [product name] will be delivered in [time information]," with [product name] and [time information] corresponding to portions to be populated. In another example, a television show notification template may include the natural language "[television show title] is starting in [time information]," with [televisions show title] and [time information] corresponding to portions to be populated.

The notification rendering component 275/375 may determine a notification type corresponding to the first notification content 515. For example, notification rendering component 275/375 may query the notification storage 410 for a notification type associated with the first notification content 515 in the notification storage 410. Thereafter, the notification rendering component 275/375 may query a template storage 510 (which may be implemented by the system 120 or the device 110) for template data 525 corresponding to a notification template associated with the notification type of the first notification content 515 and/or the first notification system 135a that provided the first notification data 405.

The notification rendering component 275/375 may also determine updated time information based on a time when the first notification data 405 was received (which may be represented as a timestamp associated with the first notification data 405 in the notification storage 410), a present time, and time information represented in the first notification content 515. For example, the first notification content 515 may represent a television show is starting in 15 minutes. The notification rendering component 275/375 may query the notification storage 410 for a timestamp associated with the first notification content 515 in the notification storage 410, determine a present time, and determine a duration of time between the time represented in the timestamp and the present time. The notification rendering component 275/375 may then subtract the duration of time from the time information in the first notification content 515 to determine the updated time information. For example, the timestamp may correspond to 1:45 pm, the present time may be 1:48 pm, the notification rendering component 275/375 may determine the duration of time to be 3 minutes, and thus may determine the updated time information to be 12 minutes.

The notification rendering component 275/375 may generate second notification content 545 using the template data 525, the first notification content 515, and the determined updated time information. For example, the first notification content 515 may correspond to the structured data "EventTitle: Meeting with John; Time: 15 minutes," the template data 525 may correspond to the natural language "your calendar entry titled [event title] is starting in [time information]," and the updated time information may be 11 minutes. In this example, the resulting second notification content 545 may be the natural language "your calendar entry title meeting with John is starting in 11 minutes." For further example, the first notification content 515 may correspond to the structured data "SenderName: Jane; Time: 2 minutes," the template data 525 may correspond to the natural language "you received an email from [sender name] [time information] ago," and the updated time information may be 58 minutes. In this example, the resulting second notification content 545 may be the natural language "you received an email from Jane 58 minutes ago." In another example, the first notification content 515 may correspond to the structured data "SportsTeamName: Seahawks; Time: 30 minutes," the template data 525 may correspond to the natural language "the [team name] game is starting in [time information]," and the updated time information may be 29 minutes. In this example, the resulting second notification content 545 may be the natural language "the Seahawks game is starting in 29 minutes."

Alternatively, the notification rendering component 275/375 may call the notification system 135 (that provided the notification data) to provide the second notification content 545. In at least some instances, the notification system 135 may be configured with rather sophisticated tools and business logic for generating natural language data. Thus, in at least some instances, allowing the notification system 135 to generate and provide the second notification content 545 may result in a richer, real-time second notification content as compared to if the template-based approach is used.

The notification rendering component 275/375 may send an update notification content request 535 to the notification system 135 that provided the original notification data. In the example of FIG. 5, the notification rendering component 275/375 may send the update notification content request 535 to the first notification system 135a. The update notification content request 535 may include an identifier uniquely identifying the first notification data 405 to the first notification system 135a. In at least some embodiments, this identifier may be represented in the first notification data 405. In at least some embodiments, the notification rendering component 275/375 may send the update notification content request 535 to the notification system 135 via a serial peripheral interface (SPI).

In response to receiving the update notification content request 535, the first notification system 135a may determine the first notification content 515 as stored by the first notification system 135a, and may perform natural language generation processing to generate the second notification content 545 corresponding to an updated and natural language version of the structured first notification content 515.

In at least some embodiments, the second notification content 545 may not simply include updated time information. For example, if the first notification content 515 corresponds to "a deal just started for [product name]," the first notification system 135a may determine (in response to receiving the update notification content request 535) that 85% of the product has been sold, and the second notification content 545 may be generated to correspond to "a deal for [product name] is 85% sold out" or "a deal for [product name] is almost sold out." For further example, if the first notification content 515 corresponds to "you can anticipate high winds today," the first notification system 135a may determine updated weather information (for a geographic location of the user or device 110) in response to receiving the update notification content request 535, and the second notification content 545 may be generated to correspond to "you can expect high winds and rain today." As such, it will be appreciated that the first notification system 135a may generate the second notification content 545 based on information that became available to the first notification system 135a after the first notification system 135a sent the first notification data 405 to the system 120/device 110.

In at least some embodiments, in response to receiving the update notification content request 535, the first notification system 135a may determine additional notification content that became available after sending the first notification data 405 to the device 110/system 120. In such embodiments, the first notification system 135a may perform natural language generation processing to generate the second notification content 545 to represent the first notification content 515 and the additional notification content. For example, if the first notification content 515 corresponds to a first state's results for a presidential election, the additional content may correspond to one or more additional state's results for the presidential election.

Whereas the template data 525 is limited to a particular grammar/sentence structure, the natural language generation processing (capable of being performed by the notification system 135) may be configured to account for grammar changes. For example, the first notification content 515 may correspond to the structured data "SportsTeamName: Seahawks; Time: 30 minutes," and the corresponding template data 525 may correspond to the natural language "the [team name] game is starting in [time information]." In such example, the aforementioned template-based approach for generating the second notification content 545 may be appropriate for 29 minutes after the first notification data 405 is received from the first notification system 135a as the grammar need not change because for the 29 minutes the game has yet to start. However, for 30 minutes and onward after the first notification data 405 is received, requesting the first notification system 135a to generate the second notification content 534 may be more appropriate as the grammar of the template data 425 may no longer be relevant. For example, if a duration of time between receipt of the first notification data 405 and a present time is 30 minutes in the foregoing example, the first notification system 135a may use natural language generation processing to generate second notification content 545 corresponding to "the Seahawks game is starting now" (note this grammar is different from that obtainable using the aforementioned template data 525). For further example, if a duration of time between receipt of the first notification data 405 and a present time is 38 minutes in the foregoing example, the first notification system 135a may use natural language generation processing to generate second notification content 545 corresponding to "the Seahawks game started 8 minutes ago" (note this grammar is different from that obtainable using the aforementioned template data 525). Thus, in at least some embodiments, the notification rendering component 275/375 may determine a time of receipt of the first notification data 405 from the first notification system 135a, determine a present time, determine a first duration of time between the time of receipt of the first notification data 405 and the present time, determine a second duration of time represented in the first notification content 515, determine the first duration of time is equal to or longer than the second duration of time, and send the update notification content request 535 to the first notification system 135a in response to the first duration of time being equal to or longer than the second duration of time.

In at least some embodiments, the notification rendering component 275/375 may determine a rating associated with a notification system 135 (or other value representing the notification system 135 will generate the second notification content 545 without including profanity or other adult-only content in the second notification content 545), and may only send the update notification content request 535 to the notification system 135 if the rating (or other value) satisfies a condition (e.g., meets or exceeds a threshold rating/value). Such processing configures the notification rendering component 275/375 to only a notification system 135 (trusted by the notification rendering component 275/375) generate second notification content 545, as in at least some embodiments the notification rendering component 275/375 may not be configured to check the second notification content 545 for profanity or other adult-only content. The rating or other value may be based at least in part on user feedback data received from users of the system 100 with respect to previous data generated by the notification system 135.

After the first notification system 135a generates the second notification content 545, the first notification system 135a sends the second notification content 545 to the notification rendering component 275/375.

The notification rendering component 275/375 sends the second notification content 545 (either received from the first notification system 135a or generated using the template data 525) to the notification component 265/365. The notification component 265/365 sends the second notification content 545 to the notification skill component 290a/390a, which sends the second notification content 545 to the device 110 for output to the user 5. In at least some embodiments, the notification component 265/365 may send the second notification content 545 to the TTS component 280/380, the TTS component 280/380 may perform TTS processing on the second notification content data 545 to generate audio data including synthesized speech corresponding to the natural language second notification content, and the audio data may be sent to the device 110 to output the synthesized speech. Additionally or alternatively, the device 110 may display the second notification content 545 on a display included in or otherwise associated with the device 110.

In at least some embodiments, the notification rendering component 275/375 may not be configured to determine whether the first notification content 515 is to be updated. Rather, in response to receiving the first notification content 515, the notification rendering component 275/375 may automatically send the update notification content request 535 to the first notification system 135a. In response to receiving the update notification content request 535, the first notification system 135a may make a determination as to whether the first notification content 515 should be output to the user 5, or whether the second notification content 545 is to be generated and output. If the first notification system 135a determines the first notification content 515 should be output, the first notification system 135a may send an indication of such to the notification rendering component 275/375, the notification rendering component 275/375 may send the indication to the notification component 265/365, the notification component 265/365 may send the first notification content 515 to the notification skill component 290a/390a, and the notification skill component 290a/390a may cause the device 110 to present the first notification content 515 on a display (of or otherwise associated with the device 110) and/or output the first notification content 515 as synthesized speech. Conversely, if the first notification system 135a determines the first notification content 515 is to be updated, the first notification system 135a may generate the second notification content 545 and send same to the notification rendering component 275/375, at which point the components of FIG. 5 may process as described herein above.

In addition to the foregoing, the system 100 may be configured to output a notification proactively (i.e., not in response to a user input explicitly requesting the notification be output). In at least some instances, such a notification may be referred to as an announcement.

Figure 6:
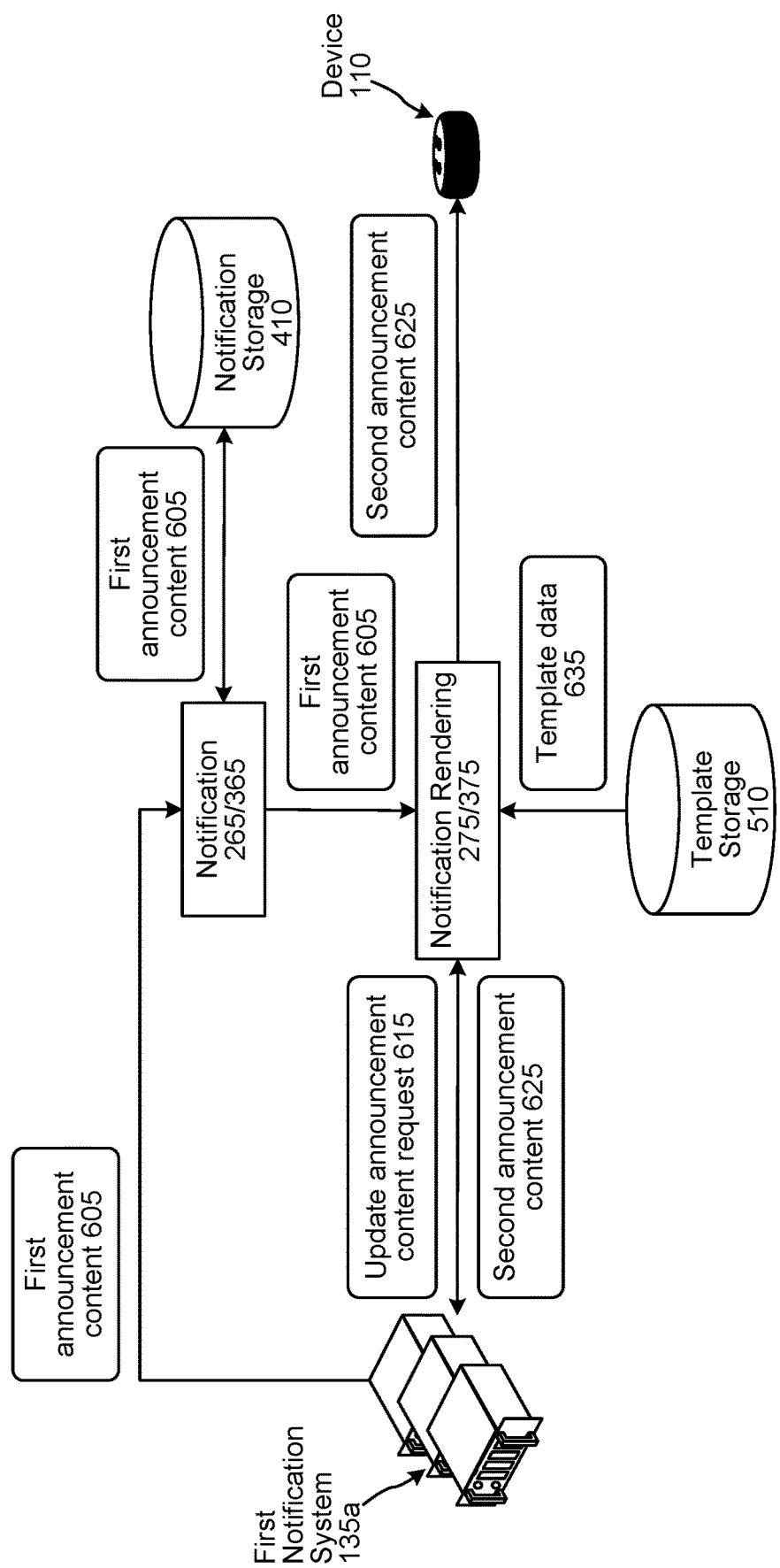
FIG. 6 is a conceptual diagram of components for generating updated announcement content at a time of output of an announcement, according to embodiments of the present disclosure.

Referring to FIG. 6, in at least some situations, the first notification system 135a may provide structured, tagged, non-natural language, first announcement content 605 (to be proactively output) to the notification component 265/365, but the notification rendering component 275/375 may not render the announcement content to the intended user and/or group of users until sometime after receiving the announcement data. For example, the first notification system 135a may provide the notification component 265/365 with the first announcement content 605 during a time when the notification component 265/365 is to render a significant amount (e.g., millions) of notifications/announcements to users of the system 100. Due to scaling and other requirements, the notification component 265/365 may be unable to render the significant amount of notifications/announcements immediately.

Sometime after receiving the first announcement content 605 and storing the first announcement content 605 in the notification storage 410, the notification component 265/365 may query the notification storage 410 for the first announcement content 605 to be proactively output to an intended user and/or group of users. After receiving the first announcement content 605, the notification component 265/365 sends the first announcement content 605 to the notification rendering component 275/375.

In response to receiving the first announcement content 605, the notification rendering component 275/375 determines whether the first announcement content 605 should be updated, or should be output without updated content. The notification rendering component 275/375 may make this determination based on one or more considerations.

The notification rendering component 275/375 may determine whether the first announcement content 605 is to be updated based at least in part on data provided by the first notification system 135a at runtime when providing first announcement data (including the first announcement content 605) to the notification component 265/365. For example, the first announcement data may include a portion representing whether the first announcement content 605 is to be updated when rendering the first announcement content 605 for output to the intended user and/or group of users. When the first announcement data includes such a data portion, the notification component 265/365 may send the data portion to the notification rendering component 275/375 in conjunction with sending the first announcement content 605 to the notification rendering component 275/375. Alternatively, the notification rendering component 275/375 may query the notification storage 410 regarding whether the first announcement content 605 is associated (in the notification storage 410) with data representing the first announcement content 60 is to be updated at time of rendering.

The notification rendering component 275/375 may determine whether the first announcement content 605 is to be updated based at least in part on data provided by a notification system 135 during offline operations. For example, when a notification system 135 registers with the system 100 to provide announcements to users of the system 100, the notification system 135 may indicate one or more announcement types (that will be provided to the notification component 265/365 by the notification system 135 after the notification system 135 becomes registered) that are to be updated when being output to the intended user and/or group of users. The system 120/device 110 may store data indicating, for a given notification system, one or more announcement types that are to undergo updating. At runtime, after receiving the first announcement content 605 from the notification component 265/365, the notification rendering component 275/375 may determine a first notification system identifier (of the first notification system 135a that provided the first announcement content 605 to the notification component 265/365), determine one or more announcement types associated with the first notification system identifier in storage, and determine whether a type of the first announcement content XXO0 is represented in the one or more announcement types. Illustrative announcement types include weather information notifications, television show reminder notifications, taxi anticipated arrival notifications, electronic calendar event notifications, and product delivery notifications.

The notification rendering component 275/375 may determine whether the first announcement content 605 is to be updated based at least in part on an output of a trained classifier at runtime. For example, the notification rendering component 275/375 may implement a trained classifier to categorize announcement content as corresponding to one of a plurality of announcement types. The notification rendering component 275/375 may implement the trained classifier with respect to the first announcement content 605 to determine the first announcement content 605 corresponds to a particular announcement type, and may determine whether the first announcement content 605 is to be updated based on the categorized announcement type of the first announcement content 605.

If the notification rendering component 275/375 determines the first announcement content 605 does not need to be updated, the notification rendering component 275/375 may cause the first announcement content 605 to be output a device 110 of the intended user and/or group of users. For example, the notification rendering component 275/375 may use one or more art-known/industry-known natural language generation techniques to generate natural language text data representing the first announcement content 605. For further example, the notification rendering component 275/375 may use a template to render the first announcement content 605 into natural language text data. The natural language text data may be sent to the device 110 for display. Additionally or alternatively, the natural language text data may be sent to the TTS component 280/380, the TTS component 280/380 may perform TTS processing on the natural language text data to generate audio data including synthesized speech corresponding to the natural language text data, and the audio data may be sent to the device 110 to output the synthesized speech.

Conversely, if the notification rendering component 275/375 determines the first announcement content 60 is to be updated, the notification rendering component 275/375 may determine which, of a plurality of techniques, is to be used to update the first announcement content 605.

The notification rendering component 275/375 may use a template-based approach to generate second announcement content 625 corresponding to an updated natural language version of the structured, non-natural language first announcement content 605. A template may include natural language with portions (e.g., variables) to be populated with information from the first announcement content 605. A template may be associated with a notification system 135. A template may additionally or alternatively be associated with a specific announcement type. For example, a calendar event announcement template may include the natural language "your calendar entry titled [event title] is starting in [time information]," with [event title] and [time information] corresponding to portions to be populated. For further example, an email announcement template may include the natural language "you received an email from [sender name] [time information] ago," with [sender name] and [time information] corresponding to portions to be populated. In another example, a sporting event announcement template may include the natural language "the [team name] game is starting in [time information]," with [team name] and [time information] corresponding to portions to be populated. For further example, a weather announcement template may include the natural language "it will be [weather type] at your location in about [time information]," with [weather type] and [time information] corresponding to portions to be populated. In another example, a taxi arrival announcement template may include the natural language "your ride from [taxi service name] is expected to arrive in [time information], be on the lookout for a [vehicle information] having license plate number [license plate number] at [pickup location]," with [taxi service name], [time information], [vehicle information], [license plate number], and [pickup location] corresponding to portions to be populated. For further example, a product delivery announcement template may include the natural language "your [product name] will be delivered in [time information]," with [product name] and [time information] corresponding to portions to be populated. In another example, a television show announcement template may include the natural language "[television show title] is starting in [time information]," with [televisions show title] and [time information] corresponding to portions to be populated.

The notification rendering component 275/375 may determine an announcement type corresponding to the first announcement content 605. For example, notification rendering component 275/375 may query the notification storage 410 for an announcement type associated with the first announcement content 605 in the notification storage 410. Thereafter, the notification rendering component 275/375 may query the template storage 510 (which may be implemented by the system 120 or the device 110) for template data 635 corresponding to an announcement template associated with the announcement type of the first announcement content 605 and/or the first notification system 135a that provided the first announcement content 605.

The notification rendering component 275/375 may also determine updated time information based on a time when the first announcement content 605 was received (which may be represented as a timestamp associated with the first announcement content 605 in the notification storage 410), a present time, and time information represented in the first announcement content 605. For example, the first announcement content 605 may represent a television show is starting in 15 minutes. The notification rendering component 275/375 may query the notification storage 410 for a timestamp associated with the first announcement content 605 in the notification storage 410, determine a present time, and determine a duration of time between the time represented in the timestamp and the present time. The notification rendering component 275/375 may then subtract the duration of time from the time information in the first announcement content 605 to determine the updated time information. For example, the timestamp may correspond to 1:45 pm, the present time may be 1:48 pm, the notification rendering component 275/375 may determine the duration of time to be 3 minutes, and thus may determine the updated time information to be 12 minutes.

The notification rendering component 275/375 may generate second announcement content 625 using the template data 635, the first announcement content 605, and the determined updated time information. For example, the first announcement content 605 may correspond to the structured data "EventTitle: Meeting with John; Time: 15 minutes," the template data 635 may correspond to the natural language "your calendar entry titled [event title] is starting in [time information]," and the updated time information may be 11 minutes. In this example, the resulting second announcement content 625 may be the natural language "your calendar entry title meeting with John is starting in 11 minutes." For further example, the first announcement content 605 may correspond to the structured data "SenderName: Jane; Time: 2 minutes," the template data 635 may correspond to the natural language "you received an email from [sender name] [time information] ago," and the updated time information may be 58 minutes. In this example, the resulting second announcement content 625 may be the natural language "you received an email from Jane 58 minutes ago." In another example, the first announcement content 605 may correspond to the structured data "SportsTeamName: Seahawks; Time: 30 minutes," the template data 635 may correspond to the natural language "the [team name] game is starting in [time information]," and the updated time information may be 29 minutes. In this example, the resulting second announcement content 625 may be the natural language "the Seahawks game is starting in 29 minutes."

Alternatively, the notification rendering component 275/375 may call the notification system 135 (that provided the first announcement data 605) to provide the second announcement content 625. In at least some instances, the notification system 135 may be configured with rather sophisticated tools and business logic for generating natural language data. Thus, in at least some instances, allowing the notification system 135 to generate and provide the second announcement content 625 may result in a richer, real-time second announcement content as compared to if the template-based approach is used.

The notification rendering component 275/375 may send an update announcement content request 615 to the notification system 135 that provided the original announcement data. In the example of FIG. 6, the notification rendering component 275/375 may send the update announcement content request 615 to the first notification system 135a. The update announcement content request 625 may include an identifier uniquely identifying the first announcement content 605 to the first notification system 135a. In at least some embodiments, this identifier may be represented in first announcement data (including the first announcement content 605) previously received from the first notification system 135a and stored in the notification storage 410. In at least some embodiments, the notification rendering component 275/375 may send the update announcement content request 615 to the notification system 135 via a serial peripheral interface (SPI).

In response to receiving the update announcement content request 625, the first notification system 135a may determine the first announcement content 605 as stored by the first notification system 135a, and may perform natural language generation processing to generate the second notification content 625 corresponding to an updated and natural language version of the structured first announcement content 605.

In at least some embodiments, the second announcement content 625 may not simply include updated time information. For example, if the first announcement content 605 corresponds to "a deal just started for [product name]," the first notification system 135a may determine (in response to receiving the update announcement content request 615) that 85% of the product has been sold, and the second announcement content 625 may be generated to correspond to "a deal for [product name] is 85% sold out" or "a deal for [product name] is almost sold out." For further example, if the first announcement content 605 corresponds to "you can anticipate high winds today," the first notification system 135a may determine updated weather information (for a geographic location of the user or device 110) in response to receiving the update announcement content request 615, and the second announcement content 625 may be generated to correspond to "you can expect high winds and rain today." As such, it will be appreciated that the first notification system 135a may generate the second announcement content 625 based on information that became available to the first notification system 135a after the first notification system 135a sent the first announcement content 605 to the system 120/device 110.

In at least some embodiments, in response to receiving the update announcement content request 615, the first notification system 135a may determine additional announcement content that became available after sending the first announcement data 605 to the device 110/system 120. In such embodiments, the first notification system 135a may perform natural language generation processing to generate the second announcement content 625 to represent the first announcement content 615 and the additional announcement content. For example, if the first announcement content 615 corresponds to a first state's results for a presidential election, the additional announcement may correspond to one or more additional state's results for the presidential election.

Whereas the template data 635 is limited to a particular grammar/sentence structure, the natural language generation processing (capable of being performed by the notification system 135) may be configured to account for grammar changes. For example, the first announcement content 605 may correspond to the structured data "SportsTeamName: Seahawks; Time: 30 minutes," and the corresponding template data 635 may correspond to the natural language "the [team name] game is starting in [time information]." In such example, the aforementioned template-based approach for generating the second announcement content 625 may be appropriate for 29 minutes after the first announcement content 605 is received from the first notification system 135a as the grammar need not change because for the 29 minutes the game has yet to start. However, for 30 minutes and onward after the first announcement content 605 is received, requesting the first notification system 135a to generate the second announcement content 624 may be more appropriate as the grammar of the template data 635 may no longer be relevant. For example, if a duration of time between receipt of the first announcement content 605 and a present time is 30 minutes in the foregoing example, the first notification system 135a may use natural language generation processing to generate second announcement content 625 corresponding to "the Seahawks game is starting now" (note this grammar is different from that obtainable using the aforementioned template data 525). For further example, if a duration of time between receipt of the first announcement content 605 and a present time is 38 minutes in the foregoing example, the first notification system 135*a* may use natural language generation processing to generate second announcement content 625 corresponding to "the Seahawks game started 8 minutes ago" (note this grammar is different from that obtainable using the aforementioned template data 525). Thus, in at least some embodiments, the notification rendering component 275/375 may determine a time of receipt of the first announcement content 605 from the first notification system 135*a*, determine a present time, determine a first duration of time between the time of receipt of the first announcement content 605 and the present time, determine a second duration of time represented in the first announcement content 605, determine the first duration of time is equal to or longer than the second duration of time, and send the update announcement content request 615 to the first notification system 135*a* in response to the first duration of time being equal to or longer than the second duration of time.

In at least some embodiments, the notification rendering component 275/375 may determine a rating associated with a notification system 135 (or other value representing the notification system 135 will generate the second announcement content 625 without including profanity or other adult-only content in the second notification content 545), and may only send the update announcement content request 615 to the notification system 135 if the rating (or other value) satisfies a condition (e.g., meets or exceeds a threshold rating/value). Such processing configures the notification rendering component 275/375 to only let a notification system 135 (trusted by the notification rendering component 275/375) generate second announcement content 625, as in at least some embodiments the notification rendering component 275/375 may not be configured to check the second announcement content 625 for profanity or other adult-only content. The rating or other value may be based at least in part on user feedback data received from users of the system 100 with respect to previous data generated by the notification system 135.

After the first notification system 135*a* generates the second announcement content 625, the first notification system 135*a* sends the second announcement content 625 to the notification rendering component 275/375.

The notification rendering component 275/375 may send the second announcement content 625 to the TTS component 280/380, the TTS component 280/380 may perform TTS processing on the second announcement content 625 to generate audio data including synthesized speech corresponding to the natural language second announcement content 625, and the audio data may be sent to the device 110 to output the synthesized speech. Additionally or alternatively, the device 110 may display the second announcement content 625 on a display included in or otherwise associated with the device 110.

In at least some embodiments, the second announcement content 625 may be sent to a smart phone, tablet, or the like via a mobile push protocol that causes the smart phone, tablet, or the like to display the second announcement content 625 as a popup graphical element (e.g., a banner).

In at least some embodiments, the second announcement content 625 may correspond to a shortened version of the first announcement content 605. In at least some embodiments, the type of device 110 to be used to output the second announcement content 625 may influence whether the second announcement content 625 is a shortened version of the first announcement content 605. For example, the second announcement content 625 may be a shortened version when the second announcement content 625 is to be displayed by device 110 such as a smart phone or other device with a relatively small screen.

In at least some embodiments, the notification rendering component 275/375 may not be configured to determine whether the first announcement content 605 is to be updated. Rather, in response to receiving the first notification content 605, the notification rendering component 275/375 may automatically send the update announcement content request 615 to the first notification system 135*a*. In response to receiving the update announcement content request 615, the first notification system 135*a* may make a determination as to whether the first announcement content 605 should be output to the user 5, or whether the second announcement content 625 is to be generated and output. If the first notification system 135*a* determines the first announcement content 605 should be output, the first notification system 135*a* may send an indication of such to the notification rendering component 275/375, and the notification rendering component 275/375 may cause the device 110 to present the first announcement content 605 on a display (of or otherwise associated with the device 110) and/or output the first announcement content 605 as synthesized speech. Conversely, if the first notification system 135*a* determines the first announcement content 605 is to be updated, the first notification system 135*a* may generate the second announcement content 625 and send same to the notification rendering component 275/375, and the notification rendering component 275/375 may cause the device 110 to present the second announcement content 625 on a display (of or otherwise associated with the device 110) and/or output the second announcement content 625 as synthesized speech.

Figure 7:
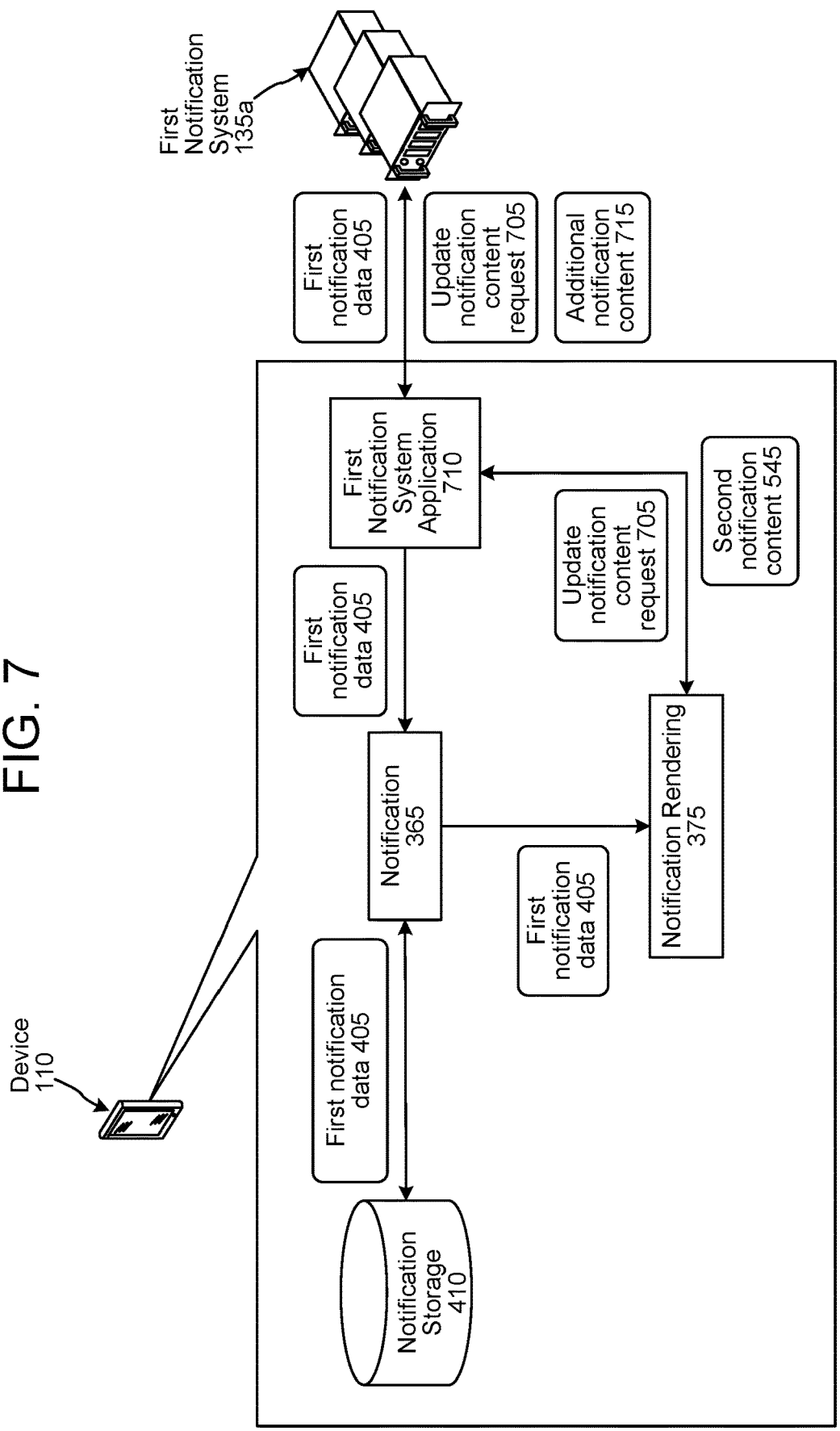
FIG. 7 is a conceptual diagram of components of a device for generating updated notification content at a time of output of a notification, according to embodiments of the present disclosure.

Referring now to FIG. 7, it is described how a device 110 (e.g., a smart phone, tablet, or the like) may, in at least some embodiments, be configured to generate updated notification content at a time of output of a notification. The device 110 may be configured with a first notification system application 710 associated with the first notification system 135*a*. For example, the first notification system 135 may be a taxi system, and the first notification system application 710 may be an application of the taxi system executed by the device 110. The first notification system 135*a* may send the first notification data 405 to the first notification system application 710. The first notification system application 710 may in turn send the first notification data 405 to the notification component 365, which stores the first notification data 405 in the notification storage 410. Thereafter, the device 110 may process, as described with respect to FIG. 4, to indicate to the user 5 that the user 5 has received a notification.

Sometime after the notification delivery component 385 causes the device 110 to indicate the user 5 has received a notification, a device 110 may receive a user input to output content corresponding to the notification. For example, the device 110 may receive audio corresponding to a spoken natural language user input to output the content. For further example, the device 110 may receive a text-based (e.g., typed) natural language user input to output the content. In another example, the device 110 may include or otherwise be associated with a camera that captures a sequence of images representing the user 5 performing a gesture (an example of a user input) to output the content. In a further example, the device 110 may include a button or display a virtual button (or other GUI element capable of being interacted with by the user 5), and the device 110 may detect the user 5 interacting with the button or other GUI element (an example of a user input) to output the content.

The device 110 may locally process data representing the user input (e.g., audio data representing a spoken natural language user input, text data representing a text-based natural language user input, data representing a performed gesture, data representing a button interaction, etc.) to determine the user input represents the content is to be output. In response, the device 110 sends, to the locally implemented notification component 365, data representing notification content is to be output. In response to receiving such data, the notification component 365 queries the notification storage for the first notification data 405, and sends the first notification data 405 to the notification rendering component 375.

In response to receiving the first notification data 405, the notification rendering component 375 determines whether the first notification content (in the notification data 405) should be updated, or should be output without updated content. The notification rendering component 375 may make this determination based on one or more considerations, such as those described herein above with respect to FIG. 5. If the notification rendering component 375 determines the first notification content does not need to be updated, the notification rendering component 375 may cause the first notification content to be output by the device 110. For example, the notification rendering component 375 may use one or more art-known/industry-known natural language generation techniques to generate natural language text data representing the first notification content. For further example, the notification rendering component 375 may use a template to render the first notification content into natural language text data. The natural language text data may be presented using a display of or otherwise associated with the device 110. Additionally or alternatively, the natural language text data may be sent to the TTS component 380, the TTS component 380 may perform TTS processing on the natural language text data to generate audio data including synthesized speech corresponding to the natural language text data, and the synthesized speech may be output using a speaker(s) of or otherwise associated with the device 110.

Conversely, if the notification rendering component 375 determines the first notification content is to be updated, the notification rendering component 375 may send an update notification content request 705 to the first notification system application 710. The first notification system application 710 may, in turn, send the update notification content request 705 to the first notification system 135a. The update notification content request 705 may include an identifier uniquely identifying the first notification data 405 to the first notification system 135a. In at least some embodiments, this identifier may be represented in the first notification data 405.

In response to receiving the update notification content request 705, the first notification system 135a may determine the first notification content as stored by the first notification system 135a, determine additional notification content 715 that became available after sending the first notification data 405 to the device 110, and may send the additional notification content 715 to the first notification system application 710, which may send the additional notification content 715 to the notification rendering component 375. For example, if the first notification content corresponds to a first state's results for a presidential election, the additional content may correspond to one or more additional state's results for the presidential election.

The notification rendering component 375 may use a template-based and/or art known/industry known natural language generation technique(s) to generate natural language notification content representing the first notification content and the additional notification content. The device 110 may thereafter present the natural language notification content as text (on a display of or otherwise associated with the device 110) and/or output the natural language notification content as synthesized speech.

Figure 8:
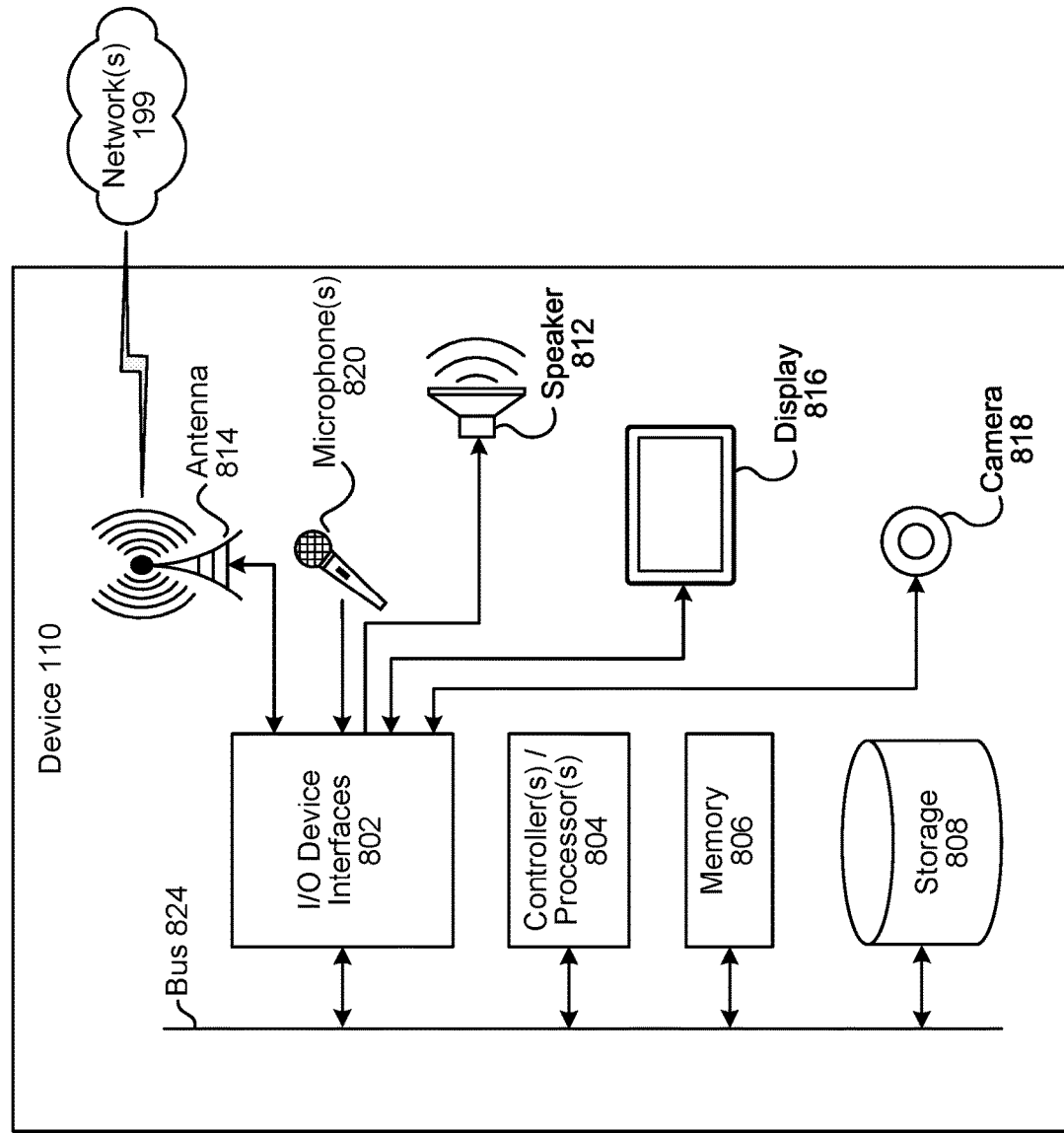
FIG. 8 is a block diagram conceptually illustrating example components of a device, according to embodiments of the present disclosure.
Figure 9:
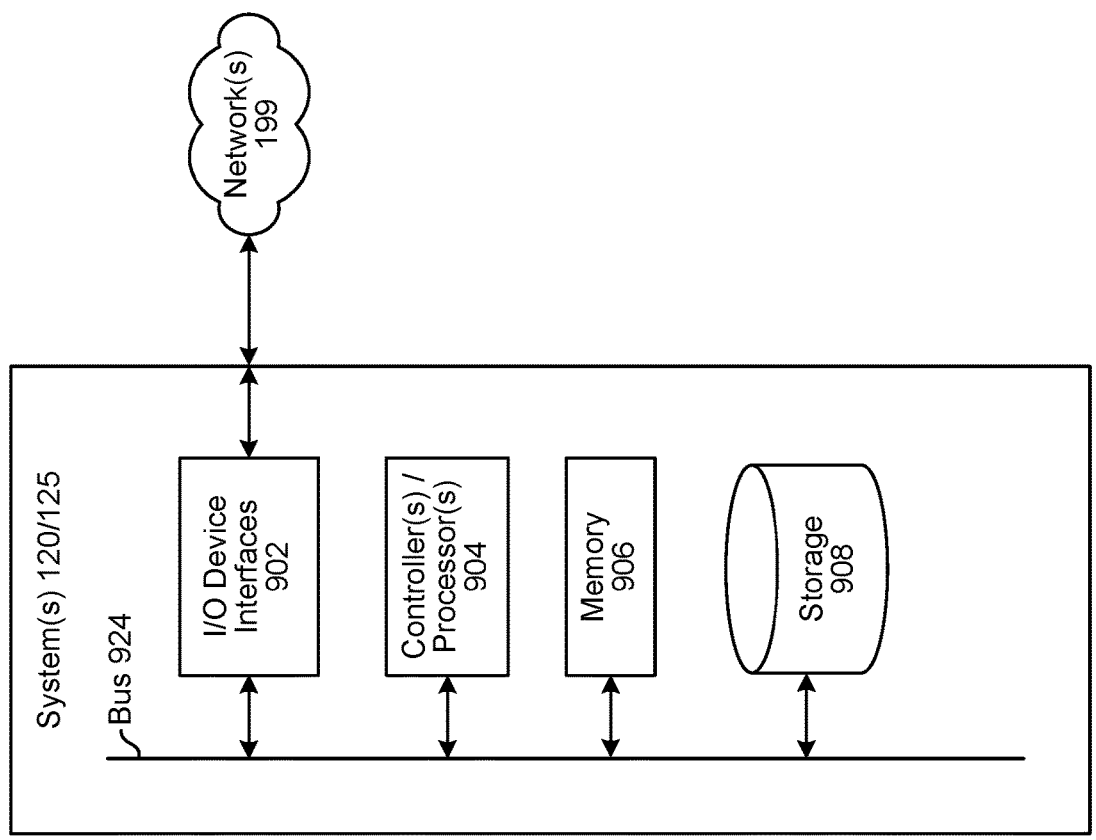
FIG. 9 is a block diagram conceptually illustrating example components of a system, according to embodiments of the present disclosure.

FIG. 8 is a block diagram conceptually illustrating example components of a device 110 according to the present disclosure. FIG. 9 is a block diagram conceptually illustrating example components of a system, such as the system 120 or a skill system 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system 120 may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the system 100 of the present disclosure, such as one or more systems 120 for performing ASR processing, one or more systems 120 for performing NLU processing, and one or more skill systems 125, etc. In operation, each of these systems may include computer-readable and computer-executable instructions that reside on the respective device (120/125), as will be discussed further below.

Each of these devices (110/120/125) may include one or more controllers/processors (804/904), which may each include a central processing unit (CPU) for processing data and computer-readable instructions, and a memory (806/906) for storing data and instructions of the respective device. The memories (806/906) may individually include volatile random access memory (RAM), non-volatile read only memory (ROM), non-volatile magnetoresistive memory (MRAM), and/or other types of memory. Each device (110/120/125) may also include a data storage component (808/908) for storing data and controller/processor-executable instructions. Each data storage component (808/908) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (802/902).

Computer instructions for operating each device (110/120/125) and its various components may be executed by the respective device's controller(s)/processor(s) (804/904), using the memory (806/906) as temporary "working" storage at runtime. A device's computer instructions may be stored in a non-transitory manner in non-volatile memory (806/906), storage (808/908), or an external device(s). Alternatively, some or all of the executable instructions may be embedded in hardware or firmware on the respective device in addition to or instead of software.

Each device (110/120/125) includes input/output device interfaces (802/902). A variety of components may be connected through the input/output device interfaces (802/902), as will be discussed further below. Additionally, each device (110/120/125) may include an address/data bus (824/924) for conveying data among components of the respective device. Each component within a device (110/120/125) may also be directly connected to other components in addition to (or instead of) being connected to other components across the bus (824/924).

Referring to FIG. 8, the device 110 may include input/output device interfaces 802 that connect to a variety of components such as an audio output component such as a speaker 812, a wired headset or a wireless headset (not illustrated), or other component capable of outputting audio. The device 110 may also include an audio capture component. The audio capture component may be, for example, a microphone 820 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 816 for displaying content. The device 110 may further include a camera 818.

Via antenna(s) 814, the input/output device interfaces 802 may connect to a network(s) 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (802/902) may also include communication components that allow data to be exchanged between devices such as different physical servers in a collection of servers or other components.

The components of the device 110, the system 120, and/or a skill system 125 may include their own dedicated processors, memory, and/or storage. Alternatively, one or more of the components of the device 110, the system 120, and/or a skill system 125 may utilize the I/O interfaces (802/902), processor(s) (804/904), memory (806/906), and/or storage (808/908) of the device(s) 110, system 120, or the skill system 125, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system 120, and a skill system 125, as described herein, are illustrative, and may be located as a stand-alone device or may be included, in whole or in part, as a component of a larger device or system.

Figure 10:
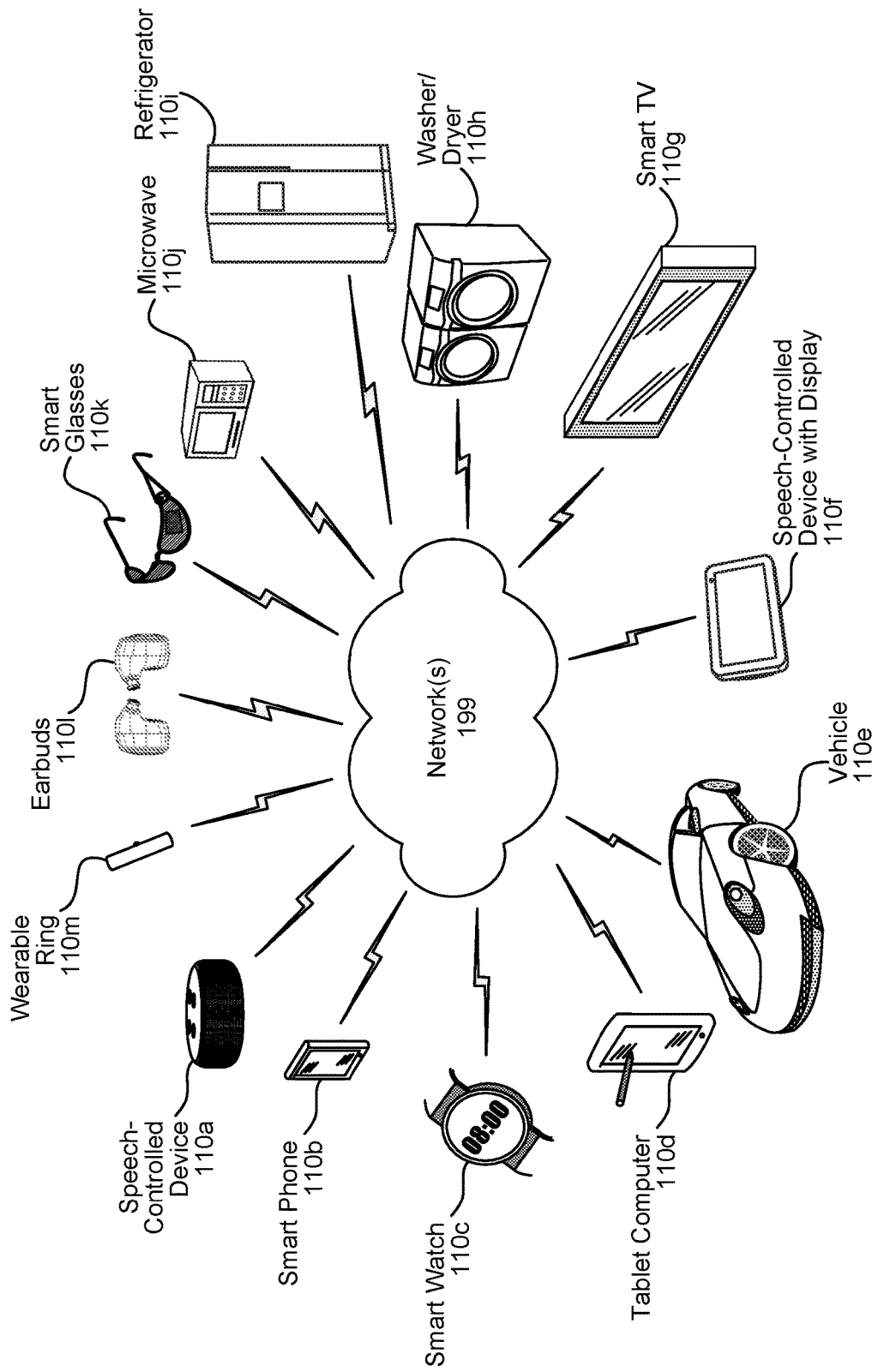
FIG. 10 illustrates an example of a computer network for use with the overall system, according to embodiments of the present disclosure.

As illustrated in FIG. 10, multiple devices (110a-110l) may process as part of the system 100. The network(s) 199 may include a local or private network or may include a wide network such as the Internet. Devices may be connected to the network(s) 199 through either wired or wireless connections. For example, the system 100 may include a speech-controlled device(s) 110a, a smart phone(s) 110b, a smart watch(s) 110c, a tablet computer(s) 110d, a vehicle(s) 110e, a speech-controlled display device(s) with a display 110f, a smart television(s) 110g, a washer(s)/dryer(s) 110h, a refrigerator(s) 110i, a microwave(s) 110j, smart glasses 110k, earbuds 110l, and/or a wearable ring(s) 110m.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
receiving, by a second computing system from a first computing system, first structured notification data, the first structured notification data including first content;
receiving, by the second computing system from a first device, first audio data representing a first spoken natural language input;
processing the first audio data to determine the first spoken natural language input requests output corresponding to the first structured notification data;
determining the first content corresponds to a first notification type;
based on the first content corresponding to the first notification type, determining the first content is to be updated;
determining a value associated with the first computing system, the value representing the first computing system will generate second content without including profanity, the value being determined based on user feedback data associated with at least third content previously generated by the first computing system;
sending, from the second computing system to the first computing system, a first request for updated content based on the value satisfying a threshold value, the first request indicating the first content;
receiving, by the second computing system from the first computing system, the second content different than the first content, the second content including first natural language content;
generating second audio data including synthesized speech corresponding to the second content; and
sending the second audio data from the second computing system to the first device for output.

2. The computer-implemented method of claim 1, further comprising:
receiving, from the first computing system, structured announcement data, the first structured notification data including third content;
determining the third content corresponds to a first announcement type;
based on the third content corresponding to the first announcement type, determining the third content is to be updated;
sending, to the first computing system, a second request for updated content, the second request indicating the third content;
after sending the second request, receiving, from the first computing system, fourth content different than the third content, the fourth content including second natural language content;
determining a device identifier associated with a first user profile identifier, the device identifier corresponding to a second device; and
sending the fourth content to the second device for output.

3. The computer-implemented method of claim 1, further comprising:
receiving, from the first computing system, second structured notification data, the second structured notification data including third content;
after receiving the second structured notification data, receiving, from the first device, third audio data representing a second spoken natural language input;
processing the third audio data to determine the second spoken natural language input requests output corresponding to the second structured notification data;
after processing the third audio data, sending, to the first computing system, a second request for updated content, the second request indicating the third content;
after sending the second request, receiving, from the first computing system, first data indicating the third content is to be output; and
sending the third content to the first device for output.

4. A computer-implemented method comprising:
receiving, by a second computing system from a first computing system, first data including first content;
after receiving the first data, receiving by the second computing system, second data representing a first user input;
processing the second data to determine the first user input requests output corresponding to the first data;
determining a value associated with the first computing system, the value being determined based on user feedback data associated with at least third content previously generated by the first computing system;
sending, from the second computing system to the first computing system, a first request for updated content based on the value satisfying a condition;
after sending the first request, receiving, by the second computing system from the first computing system, second content different than the first content; and
sending the second content from the second computing system to a first device for output.

5. The computer-implemented method of claim 4, further comprising:
determining the first content corresponds to a first content type,
wherein sending the first request comprises sending the first request based at least in part on the first content corresponding to the first content type.

6. The computer-implemented method of claim 4, further comprising:
receiving, from the first computing system during offline operations, third data representing content, corresponding to a first content type, is to be updated prior to being output; and
determining the first content corresponds to a first content type,
wherein sending the first request comprises sending the first request based at least in part on the third data and the first content corresponding to the first content type.

7. The computer-implemented method of claim 4, further comprising:
receiving, from the first computing system in association with receiving the first data, third data representing the first content is to be updated prior to being output,
wherein sending the first request comprises sending the first request based at least in part on the third data.

8. The computer-implemented method of claim 4, further comprising:
receiving, from the first computing system, third data including third content;
sending, to the first computing system, a second request for updated content;
after sending the second request, receiving, from the first computing system, fourth content different than the third content;

determining a user profile identifier associated with the third data;

determining a device identifier associated with the user profile identifier, the device identifier corresponding to a second device; and sending the fourth content to the second device for output.

9. The computer-implemented method of claim 4, further comprising:

receiving, from the first computing system, third data including third content;

after receiving the third data, receiving fourth data representing a second user input;

processing the fourth data to determine the second user input requests output corresponding to the third data;

after processing the fourth data, sending, to the first computing system, a second request for updated content;

after sending the second request, receiving, from the first computing system, fifth data indicating the third content is to be output; and sending the third content to the first device for output.

10. The computer-implemented method of claim 4, further comprising:

determining, installed on the first device, a first application associated with the first computing system; and sending the first request to the first computing system via the first application.

11. A computing system, comprising:

at least one processor; and at least one memory comprising instructions that, when executed by the at least one processor, cause the computing system to:

receive, by a second computing system from a first computing system, first data including first content;

after receiving the first data, receive by the second computing system, second data representing a first user input;

process the second data to determine the first user input requests output corresponding to the first data;

determining a value associated with the first computing system, the value being determined based on user feedback data associated with at least third content previously generated by the first computing system;

send, from the second computing system to the first computing system, a first request for updated content based on the value satisfying a condition;

after sending the first request, receive, by the second computing system from the first computing system, second content different than the first content; and send the second content from the second computing system to a first device for output.

12. The computing system of claim 11, wherein the at least one memory further comprises instructions that, when executed by the at least one processor, further cause the computing system to:

determine the first content corresponds to a first content type; and send the first request based at least in part on the first content corresponding to the first content type.

13. The computing system of claim 11, wherein the at least one memory further comprises instructions that, when executed by the at least one processor, further cause the computing system to:

receive, from the first computing system during offline operations, third data representing content, corresponding to a first content type, is to be updated prior to being output;

determine the first content corresponds to a first content type; and send the first request based at least in part on the third data and the first content corresponding to the first content type.

14. The computing system of claim 11, wherein the at least one memory further comprises instructions that, when executed by the at least one processor, further cause the computing system to:

receive, from the first computing system in association with receiving the first data, third data representing the first content is to be updated prior to being output; and send the first request based at least in part on the third data.

15. The computing system of claim 11, wherein the at least one memory further comprises instructions that, when executed by the at least one processor, further cause the computing system to:

receive, from the first computing system, third data including third content;

send, to the first computing system, a second request for updated content;

after sending the second request, receive, from the first computing system, fourth content different than the third content;

determine a user profile identifier associated with the third data;

determine a device identifier associated with the user profile identifier, the device identifier corresponding to a second device; and send the fourth content to the second device for output.

16. The computing system of claim 11, wherein the at least one memory further comprises instructions that, when executed by the at least one processor, further cause the computing system to:

receive, from the first computing system, third data including third content;

after receiving the third data, receive fourth data representing a second user input;

process the fourth data to determine the second user input requests output corresponding to the third data;

after processing the fourth data, send, to the first computing system, a second request for updated content;

after sending the second request, receive, from the first computing system, fifth data indicating the third content is to be output; and send the third content to the first device for output.

17. The computing system of claim 11, wherein the at least one memory further comprises instructions that, when executed by the at least one processor, further cause the computing system to:

determine, installed on the first device, a first application associated with the first computing system; and send the first request to the first computing system via the first application.

* * * * *